US012555245B2

(12) United States Patent
Kwaadgras et al.

(10) Patent No.: US 12,555,245 B2
(45) Date of Patent: Feb. 17, 2026

(54) SYSTEM AND METHOD FOR DETERMINING BACKGROUND

(71) Applicant: CRON AI LTD., London (GB)

(72) Inventors: Bastiaan Willem Kwaadgras, London (GB); Robert De Temple, Essen (DE)

(73) Assignee: CRON AI LTD, London (GB)

( * ) Notice: Subject to any disclaimer, the term of this patent is extended or adjusted under 35 U.S.C. 154(b) by 476 days.

(21) Appl. No.: 18/148,833

(22) Filed: Dec. 30, 2022

(65) Prior Publication Data

US 2024/0221173 A1 Jul. 4, 2024

(51) Int. Cl.
*G06T 7/194* (2017.01)

(52) U.S. Cl.
CPC .... *G06T 7/194* (2017.01); *G06T 2207/10028* (2013.01); *G06T 2207/20224* (2013.01)

(58) Field of Classification Search
CPC .......... G06T 7/194; G06T 2207/10028; G06V 10/764; G06V 10/766
See application file for complete search history.

(56) References Cited

U.S. PATENT DOCUMENTS

| | | | | |
|---|---|---|---|---|
| 10,163,256 | B2 * | 12/2018 | Benedek | G06T 7/194 |
| 10,182,225 | B1 * | 1/2019 | Cui | G06V 10/30 |
| 11,328,401 | B2 * | 5/2022 | Lu | G06T 7/10 |
| 11,605,201 | B2 * | 3/2023 | Ichim | G06T 7/593 |
| 11,691,630 | B2 * | 7/2023 | Morcom | G06T 17/20 |
| | | | | 348/148 |
| 11,836,937 | B2 * | 12/2023 | Thrimawithana | G05D 1/027 |
| 12,125,298 | B2 * | 10/2024 | Sun | G01S 7/4808 |

FOREIGN PATENT DOCUMENTS

| | | |
|---|---|---|
| CN | 103675939 B | 5/2016 |
| CN | 112150501 A | 12/2020 |
| CN | 112419360 A | 2/2021 |
| CN | 114596331 A | 6/2022 |
| CN | 113447953 B | 8/2022 |

(Continued)

OTHER PUBLICATIONS

Tianya Zhang, Peter J. Jin, Roadside LiDAR Vehicle Detection and Tracking Using Range and Intensity Background Subtraction.
(Continued)

*Primary Examiner* — Gregory M Desire
(74) *Attorney, Agent, or Firm* — Colson Law Group, PLLC

(57) ABSTRACT

A method for determining a background in 3D space includes: receiving, via a sensor, a plurality of data points for the 3D space; dividing the 3D space into a plurality of rays extending from the sensor; defining a plurality of peaks for each ray; and defining a catchment region for each peak for each ray. Each data point is enclosed by a corresponding ray. Each peak is located at a peak distance from the sensor and comprises a peak height. The catchment region for each peak includes a catchment distance from the corresponding peak towards and away from the sensor. For each data point from the plurality of data points, the method includes: determining the corresponding ray enclosing the data point; determining a containing peak for which the data point lies within the catchment region; and incrementing the peak height of the containing peak by a peak increment value.

18 Claims, 15 Drawing Sheets

(56) References Cited

FOREIGN PATENT DOCUMENTS

| | | |
|---|---|---|
| JP | 7107015 B2 | 7/2022 |
| KR | 102214848 B1 | 2/2021 |
| WO | 2021097618 A1 | 5/2021 |

OTHER PUBLICATIONS

Sumyeong Lee, Chansoo Kim, Sungjin Cho, Sunwoo Myoungho, Kichun Jo, Robust 3-Dimension Point Cloud Mapping in Dynamic Environment Using Point-Wise Static Probability-Based NDT Scan-Matching, Oct. 6, 2020, IEEE Access, Seoul, South Korea.

J. P. Underwood, D Gillsjo, T. Bailey, V. Vlaskine, Explicit 3D Change Detection using Ray-Tracing in Spherical Coordinates.

Gheorghii Postica, Matteo Matteucci, Andrea Romanoni, Visually aided changes detection in 3D lidar based reconstruction, Politecnico Di Milano, Milan, Italy.

* cited by examiner

SYSTEM AND METHOD FOR DETERMINING BACKGROUND

TECHNICAL FIELD

The present disclosure relates to a system for determining a background in a three-dimensional (3D) space and a method thereof.

BACKGROUND

Typically, a three-dimensional (3D) object detection system preprocesses point cloud data of a 3D space. Such preprocessing may improve an accuracy of predictions as well as reduce computational load of the 3D object detection system. This may be especially important if the 3D object detection system is on an embedded system, where computational resources may come at a premium.

For high-resolution point cloud data, a very common and challenging preprocessing step is background detection. Background detection is used to identify background portions of the point cloud data that represent stationary objects, or more precisely, surfaces on them, such as buildings or ground, which are unlikely to ever move. Such background portions need to be differentiated from other portions of the point cloud data that represent objects that are in motion or have moved recently.

The background portions of the point cloud data can subsequently be removed from the point cloud data in order to lessen the computational load of subsequent processing steps and/or improve a 3D perception (e.g., object detection) of the 3D object detection system.

Conventional background detection techniques may not be accurate, may be slow, may be inefficient, and/or require extreme computational resources (e.g., intensive in memory use). Therefore, such conventional techniques may not be feasible for the embedded systems.

SUMMARY

In a first aspect, the present disclosure provides a method for determining a background in a three-dimensional (3D) space. The method includes receiving, via a sensor, a point cloud data set for the 3D space. The point cloud data set includes a plurality of data points. The method further includes dividing the 3D space into a plurality of rays extending from the sensor. Each ray includes an azimuth and an elevation with respect to the sensor. Each data point is enclosed by a corresponding ray from the plurality of rays. The method further includes defining a plurality of peaks for each ray from the plurality of rays. Each peak from the plurality of peaks is located at a peak distance from the sensor and includes a peak height equal to a predetermined initial value. The method further includes defining a catchment region for each peak from the plurality of peaks for each ray from the plurality of rays. The catchment region for each peak includes a catchment distance from the corresponding peak towards the sensor and the catchment distance from the corresponding peak away from the sensor. For each data point from the plurality of data points, the method further includes: determining a corresponding ray from the plurality of rays enclosing the data point; determining a data point distance of the data point from the sensor; determining a peak increment value; determining the containing peak from the plurality of peaks of the corresponding ray for which the data point lies within the catchment region of the containing peak; incrementing the peak height of the containing peak by the peak increment value; and defining a new peak including a peak height equal to the peak increment value and a peak distance equal to the data point distance if the data point is outside the catchment region of each of the plurality of peaks of the corresponding ray.

In a second aspect, the present disclosure provides a system for determining a background in a three-dimensional (3D) space. The system includes a sensor configured to generate a point cloud data set for the 3D space. The point cloud data set includes a plurality of data points. The system further includes a processor communicably coupled to the sensor. The processor is configured to receive the point cloud data set from the sensor. The processor is further configured to divide the 3D space into a plurality of rays extending from the sensor. Each ray includes an azimuth and an elevation with respect to the sensor. Each data point is enclosed by a corresponding ray from the plurality of rays. The processor is further configured to define a plurality of peaks for each ray from the plurality of rays. Each peak from the plurality of peaks is located at a peak distance from the sensor and includes a peak height equal to a predetermined initial value. The processor is further configured to define a catchment region for each peak from the plurality of peaks for each ray from the plurality of rays. The catchment region for each peak includes a catchment distance from the corresponding peak towards the sensor and the catchment distance from the corresponding peak away from the sensor. For each data point from the plurality of data points, the processor is further configured to: determine the corresponding ray from the plurality of rays enclosing the data point; determine a data point distance of the data point from the sensor; determine a peak increment value; determine a containing peak from the plurality of peaks of the corresponding ray for which the data point lies within the catchment region of the containing peak; increment the peak height of the containing peak by the peak increment value; and define a new peak including a peak height equal to the peak increment value and a peak distance equal to the data point distance if the data point is outside the catchment region of each of the plurality of peaks of the corresponding ray.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
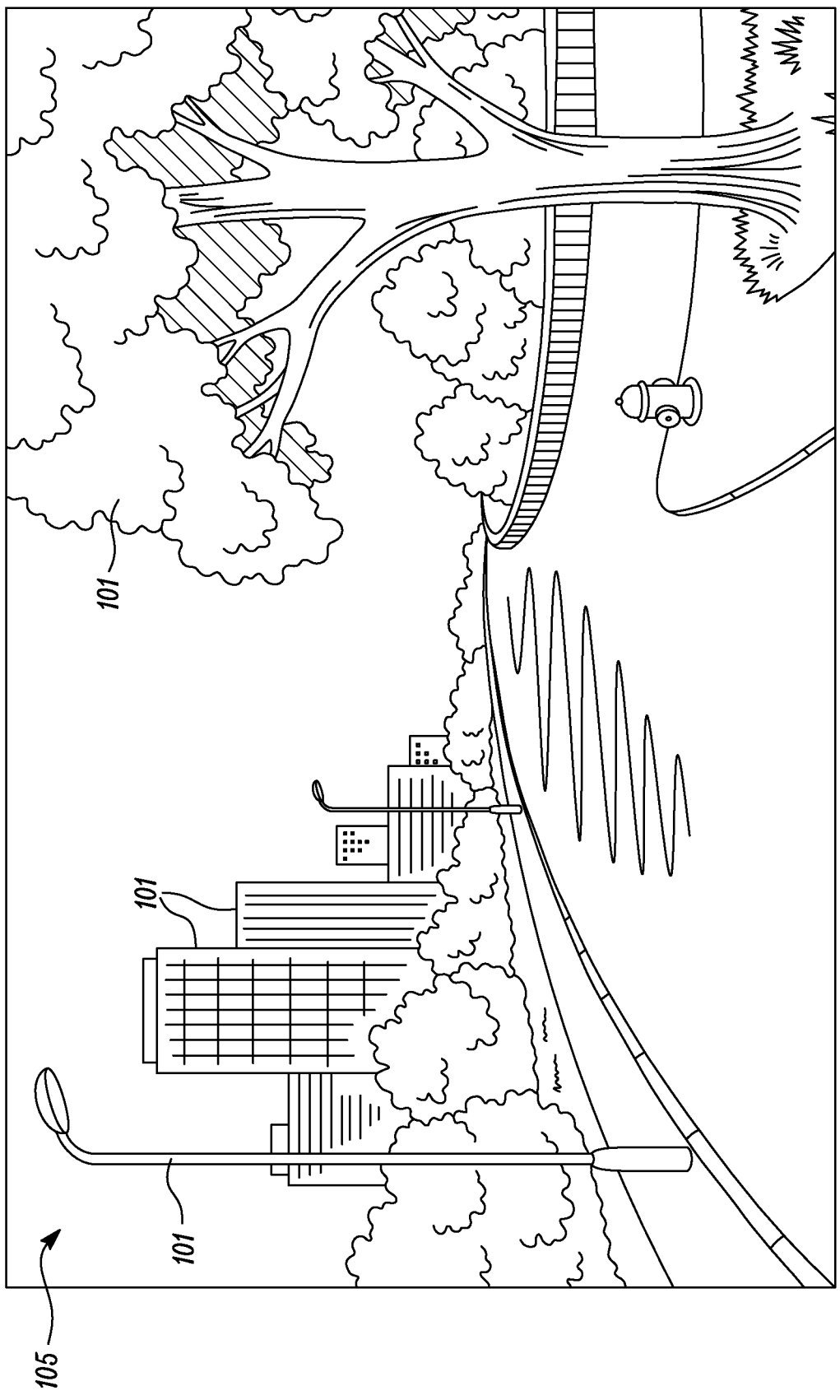
FIG. 1 illustrates a schematic view of an exemplary background in a three-dimensional (3D) space.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the terms "communicably coupled to" and "communicably connected to" refers to direct coupling between components and/or indirect coupling between components via one or more intervening components. Such components and intervening components may comprise, but are not limited to, junctions, communication paths, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner that can be recognized by the second component.

As used herein, the term "communication device" generally includes a transceiver, and/or other devices for communicating with other devices directly or via a network, and/or a user interface for communicating with one or more users.

As used herein, the term "azimuth" refers to an angle between a point projected onto a reference plane and a reference direction on the reference plane.

As used herein, the term "elevation" refers to an angle above or below the reference plane.

Typically, a three-dimensional (3D) object detection system preprocesses point cloud data of a 3D space. Such preprocessing may improve an accuracy of predictions as well as reduce computational load of the 3D object detection system. This may be especially important if the 3D object detection system is on an embedded system, where computational resources may come at a premium.

For high-resolution point cloud data, a very common and challenging preprocessing step is background detection. Background detection is used to identify background portions of the point cloud data that represent stationary objects or more precisely surfaces on them, such as buildings or ground, which are unlikely to ever move. Such background portions need to be differentiated from other portions of the point cloud data that represent objects that are in motion or have moved recently.

The background portions of the point cloud data can subsequently be removed from the point cloud data in order to lessen the computational load of subsequent processing steps and/or improve a 3D perception (e.g., object detection) of the 3D object detection system.

Conventional background detection techniques may not be accurate, may be slow, may be inefficient, and/or require extreme computational and memory resources. Therefore, such conventional techniques may not be feasible for the embedded systems. Therefore, it may be advantageous to detect background with high accuracy, in real-time, and with reduced computational and memory resource requirements.

The present disclosure provides a system and a method for determining a background in a three-dimensional (3D) space.

The method includes receiving, via a sensor, a point cloud data set for the 3D space. The point cloud data set includes a plurality of data points. The method further includes dividing the 3D space into a plurality of rays extending from the sensor. Each ray includes an azimuth and an elevation with respect to the sensor. Each data point is enclosed by a corresponding ray from the plurality of rays. The method further includes defining a plurality of peaks for each ray from the plurality of rays. Each peak from the plurality of peaks is located at a peak distance from the sensor and includes a peak height equal to a predetermined initial value. The method further includes defining a catchment region for each peak from the plurality of peaks for each ray from the plurality of rays. The catchment region for each peak includes a catchment distance from the corresponding peak towards the sensor and the catchment distance from the corresponding peak away from the sensor. For each data point from the plurality of data points, the method further includes: determining the corresponding ray from the plurality of rays enclosing the data point; determining a data point distance of the data point from the sensor; determining a peak increment value; determining a containing peak from the plurality of peaks of the corresponding ray for which the data point lies within the catchment region of the containing peak; incrementing the peak height of the containing peak by the peak increment value; and defining a new peak including a peak height equal to the peak increment value and a peak distance equal to the data point distance if the data point is outside the catchment region of each of the plurality of peaks of the corresponding ray.

The method of the present disclosure may use minimal computational and memory resources, such that the method may be suitable for running or implementing on the system, such as an embedded computer system, where computational resources may come at a premium. The most frequent operations of the method may be short and include additions and subtractions, as well as multiplications or divisions by powers of 2 of integer numbers. This may further minimize utilization of the computational and memory resources. The method may also be able to accurately track the static objects or background visible to the sensor in arbitrarily complex environments even in the presence of multiple distances reported by the sensor with each measurement. The system may further be simple to set-up and configure. Specifically, no particular setup or measurement may be required for implementing the method in a new or a different location. In addition, the method of the present disclosure may be applicable to static as well as moving sensors.

The method may further provide estimates of precision/noise level (e.g., due to environmental effects) of the sensor and may continuously optimize the operation to the current noise level. The method may also be adaptive to changes in the background (e.g., when an object is placed in view of the sensor and is stationary afterwards). Further, the method may be able to distinguish between the static and dynamic/non-static objects with a very high resolution. Furthermore, by tracking the noise level of the sensor, the high resolution should be at or close to an optimal separation limit (as allowed by the noise level of the sensor).

Therefore, the system and the method of the present disclosure may be computationally efficient, highly accurate and adaptive to changing environments, and provide real-time estimates.

Referring now to figures, FIG. 1 illustrates a schematic view of an exemplary three-dimensional (3D) space 105. The 3D space 105 includes various objects. In some cases, the objects may include static objects, i.e., the objects that are stationary and are unlikely to ever move. For example, the static objects may include buildings, roads, posts, grounds, etc., in the 3D space 105. In some cases, the objects may include dynamic objects (not shown), i.e., the objects that are moving or are likely to move. The 3D space 105 includes a background 101. The background 101 includes the static objects or specifically, surfaces of the static objects. In some cases, the objects may include also include semi-static objects, i.e., the objects that may sway. For example, the semi-static objects may include plants, trees, etc., in the 3D space 105. In some cases, the background 101 may also include the semi-static objects. In the illustrated example of FIG. 1, the 3D space is an outdoor space (i.e., a street). However, in some other examples, the 3D space 105 may be an indoor space (e.g., a part of a floor area in a building).

Figure 2:
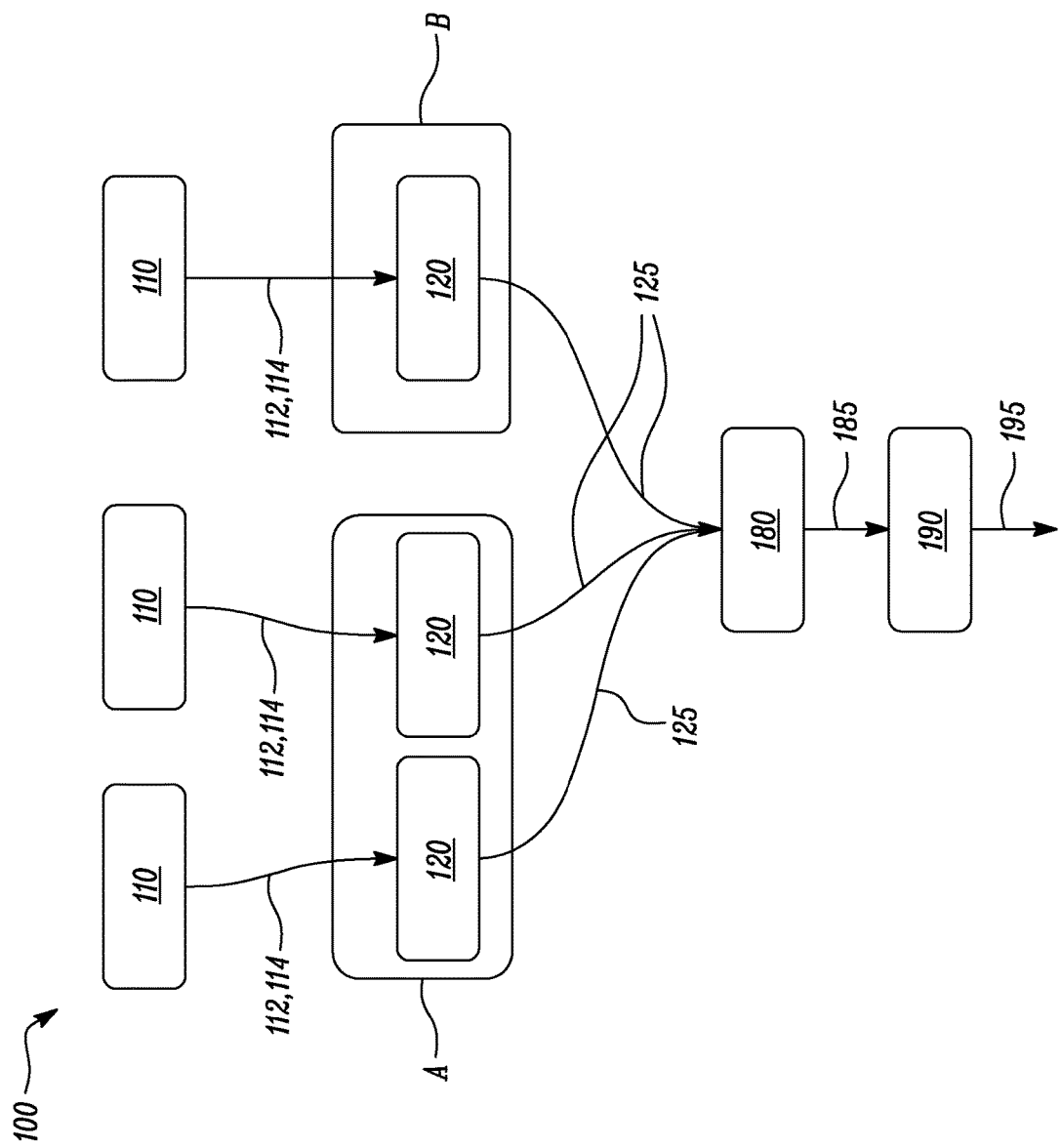
FIG. 2 illustrates a schematic block diagram of a system for determining the background in the 3D space, according to an embodiment of the present disclosure.

FIG. 2 illustrates a schematic block diagram of a system 100 for determining the background 101 (shown in FIG. 1) in the 3D space 105 (shown in FIG. 1), according to an embodiment of the present disclosure.

The system 100 includes a sensor 110 configured to generate a point cloud data set 112 for the 3D space 105. The point cloud data set 112 includes a plurality of data points 114. In some embodiments, the sensor 110 includes a 3D sensor. In an example, the 3D sensor is a light detection and ranging (LIDAR) sensor (e.g., frequency-modulated continuous-wave LIDAR), a radio detection and ranging (RADAR) sensor, an ultrasonic sensor array, a 3D camera (e.g., a time-of-flight camera, a depth camera, a stereo camera, etc.), or a combination thereof.

The system 100 further includes a processor 120. In some embodiments, the processor 120 may be implemented in a computing device A. The processor 120 is communicably coupled to the sensor 110. Specifically, in some embodiments, the computing device A is communicably coupled to the sensor 110. The processor 120 is configured to receive the point cloud data set 112 from the sensor 110. In other words, the processor 120 is configured to receive the plurality of data points 114.

In some embodiments, the computing device A may include a system-on-chip (SOC), a computer processing unit (CPU), a graphical processing unit (GPU), a tensor processing unit (TPU), a neuromorphic chip, a vector accelerator, or any other processing system. Examples of the computing device A may include a personal computer (PC), a laptop, a tablet, a touch pad, a portable computer, a handheld computer, a palmtop computer, a personal digital assistant (PDA), a smart device (e.g., smart phone, smart tablet, or smart mobile television), a mobile internet device (MID), a data communication device, a server, a desktop computer, an edge computing device, and so forth. In some examples, the computing device A also may include devices that are configured to be worn by a person. In some embodiments, the computing device A may be capable of executing other applications, as well as voice communications and/or data communications.

In the illustrated embodiment of FIG. 2, the system 100 includes a plurality of sensors 110 and a corresponding plurality of processors 120. However, the system 100 may include any number of sensors and processors, as per desired application attributes. The plurality of sensors 110 is configured to generate a corresponding plurality of point cloud data sets 112 for the 3D space 105 shown in FIG. 1. Further, the corresponding plurality of processors 120 is configured to receive the corresponding plurality of point cloud data sets 112 from the plurality of sensors 110.

In some other embodiments, one or more of the plurality of sensors 110 may be communicably coupled to one processor 120 from the plurality of processors 120. Each of the plurality of processors 120 is capable of executing an algorithm that causes the processor 120 to perform one or more of the actions, operations, methods, or functions described herein. In some embodiments, one instance of the algorithm is used for each sensor 110.

In some embodiments, at least one of the plurality of processors 120 may be implemented in a computing device B. In some embodiments, the computing device B may be substantially similar to the computing device A. However, in some other embodiments, the computing device B may be different from the computing device A.

In some embodiments, the system 100 may further include a point cloud fusion module 180. The point cloud fusion module 180 may fuse outputs 125 from each of the plurality of processors 120 to obtain a fused cloud data set 185.

In some embodiments, the system 100 may further include an object detection module 190. In some embodiments, the object detection module 190 is configured to provide one or more perception outputs 195 based on the fused cloud data set 185. In some embodiments, the one or more perception outputs 195 may include object detection, semantic segmentation, such as object boundaries and pose estimation, or any other information about the objects in the 3D space 105. Therefore, the system 100 may be used for people-tracking applications in a static setting to object detection applications in an autonomous vehicle.

Figure 3:
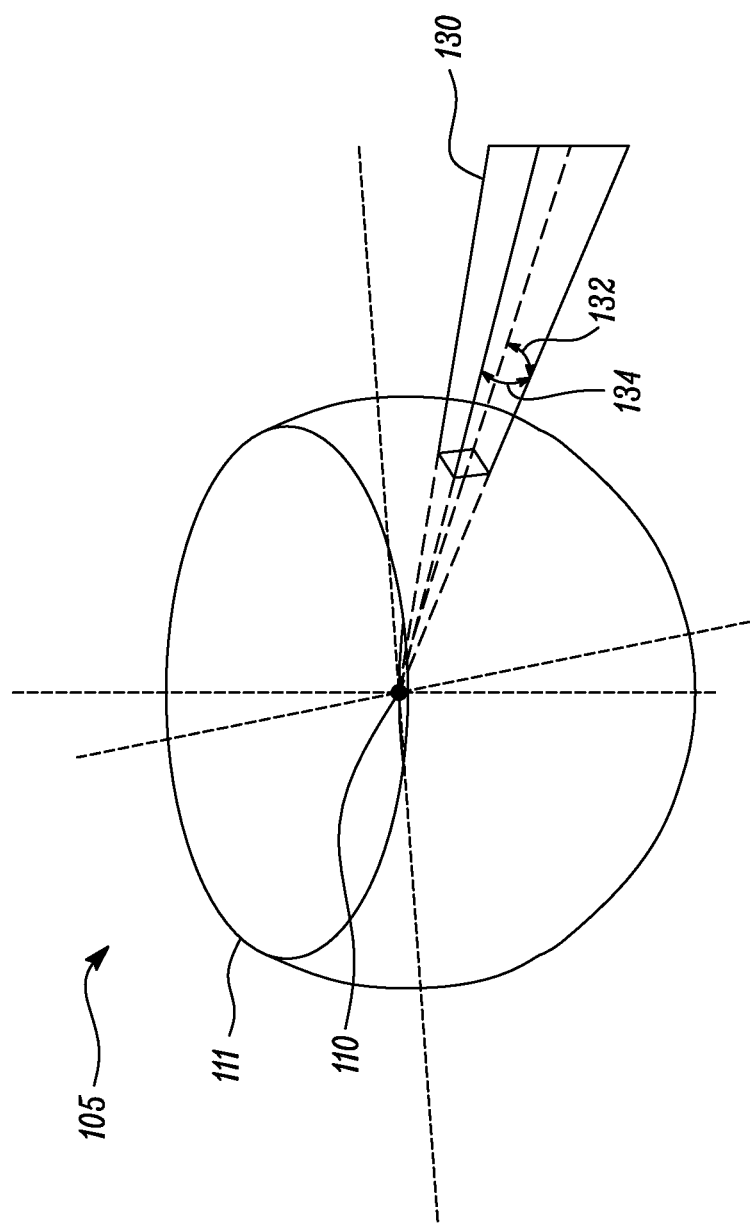
FIG. 3 illustrates a schematic view of a sensor and a field of view (FOV) of the sensor in the 3D space, according to an embodiment of the present disclosure.

FIG. 3 illustrates a schematic view of the sensor 110 and a field of view (FOV) 111 of the sensor in the 3D space 105, according to an embodiment of the present disclosure. The FOV 111 may be representative of an angular range the sensor 110 (e.g., the LIDAR sensor) covers in one measurement.

Referring to FIGS. 1, 2, and 3, the processor 120 is further configured to divide the 3D space 105 into a plurality of rays 130 extending from the sensor 110. In the illustrated embodiment of FIG. 3, only one ray 130 is shown for clarity purposes.

Each ray 130 includes an azimuth 132 and an elevation 134 with respect to the sensor 110. In other words, the processor 120 is configured to divide the 3D space 105 by the azimuth 132 and the elevation 134 as measured with respect to the sensor 110 to obtain the plurality of rays 130 extending from the sensor 110. In some embodiments, the azimuth 132 and the elevation 134 may be less than about 0.2 degrees, less than about 0.1 degrees, or less than about 0.05 degrees. Therefore, each of the plurality of rays 130 may be very narrow.

Further, each data point 114 is enclosed by a corresponding ray 130C from the plurality of rays 130.

In the illustrated embodiment of FIG. 3, a portion of the 3D space 105 encompassed by each of the plurality of rays 130 is an approximately square pyramid with its tip at the sensor 110. However, as discussed above, each of the plurality of rays 130 may be very narrow, and therefore will be treated as a one-dimensional representation. A ray typically refers to a line that has a fixed starting point but no endpoint. Similarly, the rays 130 extend from the sensor 110.

Figure 4A:
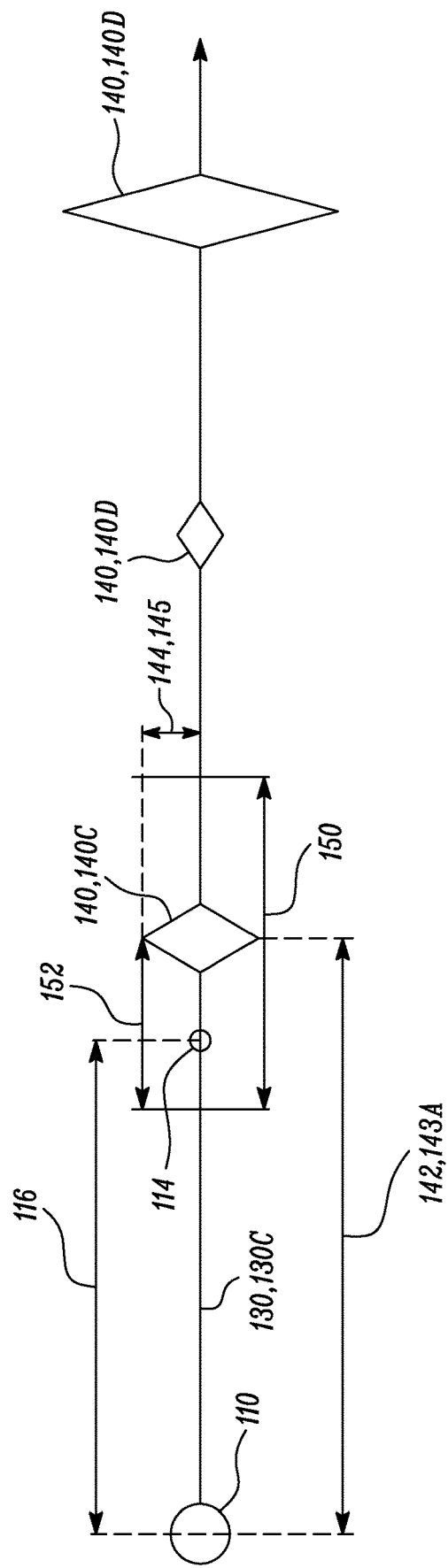
FIG. 4A illustrates a schematic representation of a corresponding ray from a plurality of rays enclosing a data point, according to an embodiment of the present disclosure.

FIG. 4A illustrates a schematic representation of the corresponding ray 130C from the plurality of rays 130 enclosing the data point 114 from the plurality of data points 114, according to an embodiment of the present disclosure. As shown in FIG. 4A, the plurality of rays 130 extends from the sensor 110.

Now referring to FIGS. 1 to 4A, the processor 120 is further configured to define a plurality of peaks 140 for each ray 130 from the plurality of rays 130. In the illustrated embodiment of FIG. 4A, the processor 120 is configured to define three peaks 140 for each ray 130 from the plurality of rays 130. However, the processor 120 may be configured to define any number of the peaks 140 for each ray 130, as per desired application attributes. In an example, storing one peak 140 in 4 bytes of storage space may be sufficiently accurate for almost all applications of the sensor 110. Assuming the three peaks 140 for each ray 130 and 2048×64 rays 130 within the FOV 111 of the sensor 110, a very modest memory usage of less than 1536 kilobytes (kB) may be required. Therefore, the algorithm may be suitable for the system 100 even if the system 100 is the embedded system.

Each peak 140 from the plurality of peaks 140 is located at a peak distance 142 from the sensor 110 and includes a peak height 144 equal to a predetermined initial value 145. Upon initialization of the algorithm, the plurality of peaks 140 may be located at any arbitrary peak distance 142 from the sensor 110 and may include any arbitrary peak height 144. For example, upon initialization, the predetermined initial value 145 of the peak height 144 may be equal to zero. In the illustrated embodiment of FIG. 4A, the peak distance 142 and the peak height 144 are shown for just one peak for clarity purposes. However, it should be noted that each peak 140 from the plurality of peaks 140 includes the peak distance 142 and the peak height 144.

The processor 120 is further configured to define a catchment region 150 for each peak 140 from the plurality of peaks 140 for each ray 130 from the plurality of rays 130. The catchment region 150 for each peak 140 includes a catchment distance 152 from the corresponding peak 140 towards the sensor 110 and the catchment distance 152 from the corresponding peak 140 away from the sensor 110. Therefore, the catchment region 150 is twice the catchment distance 152. In some embodiments, the catchment distance 152 may be equal to about 0.10 meters (m), 0.15 m, or 0.20 m. In the illustrated embodiment of FIG. 4A, the catchment region 150 and the catchment distance 152 are shown for just one peak 140 for clarity purposes. However, it should be noted that each peak 140 from the plurality of peaks 140 includes the catchment region 150 and the catchment distance 152.

In some embodiments, the processor 120 is further configured to define a maximum peak height 144M (shown in FIG. 6) for each peak 140 from the plurality of peaks 140 for each ray 130 from the plurality of rays 130, such that the peak 140 from the plurality of peaks 140 of the ray 130 from the plurality of rays 130 including the peak distance 142 greater than the peak distance 142 of another peak 140 from the plurality of peaks 140 of the ray 130 has the maximum peak height 144M greater than the maximum peak height 144M of the other peak 140. In other words, the maximum peak heights 144M for the plurality of peaks 140 for a particular ray 130 (e.g., the corresponding ray 130C) may be ordered according to the peak distances 142 of the plurality of peaks 140. Specifically, the peak 140 farther from the sensor 110 may have the maximum peak height 144M greater than the maximum peak height 144M of the peak 140 closer to the sensor 110. In some examples, the maximum peak height 144M may be defined as a power of two (e.g., the maximum peak heights 144M of the three peaks may be $4096=2^{12}$, $2048=2^{11}$, or $1024=2^{10}$). The maximum peak heights 144M as the power of two may simplify calculations, such as multiplications or divisions of integers in subsequent processing steps/modules of the algorithm.

In some other embodiments, the processor 120 may define equal maximum peak heights 144M for the plurality of peaks 140 for each ray 130 from the plurality of rays 130.

In some embodiments, the processor 120 is further configured to define a point increment base 146A (shown in FIG. 6) for each peak 140 from the plurality of peaks 140 for each ray 130 from the plurality of rays 130. The peak 140 from the plurality of peaks 140 including the peak distance 142 greater than the peak distance 142 of another peak 140 from the plurality of peaks 140 of the ray 130 has the point increment base 146A greater than point increment base 146A of the other peak 140. In other words, the point increment bases 146A for the plurality of peaks 140 for a particular ray 130 (e.g., the corresponding ray 130) may be ordered according to the peak distances 142 of the plurality of peaks 140. Specifically, the peak 140 farther from the sensor 110 may have the point increment base 146A greater than the point increment base 146A of the peak 140 closer to the sensor 110. In some examples, the point increment base 146A may be 8, (i.e., 23). The point increment base 146A as the power of two may simplify calculations, such as multiplications or divisions.

Further, for each data point 114 from the plurality of data points 114, the processor 120 is further configured to determine the corresponding ray 130C from the plurality of rays 130 enclosing the data point 114. Further, for each data point 114 from the plurality of data points 114, the processor 120 is further configured to determine a data point distance 116 of the data point 114 from the sensor 110.

For each data point 114 from the plurality of data points 114, the processor 120 is further configured to determine a containing peak 140C from the plurality of peaks 140 of the corresponding ray 130C for which the data point 114 lies within the catchment region 150 of the containing peak 140C. Therefore, the catchment distance 152 of the catchment region 150 may define a maximum distance from the peak 140 for the data point 114 to be considered as a measurement for the peak 140.

In some embodiments, in case the data point 114 lies within the catchment region 150 of multiple peaks 140 from the plurality of peaks 140 of the corresponding ray 130C, the processor 120 is further configured to determine the containing peak 140C based on at least one of the peak heights 144 of the multiple peaks 140, the peak distances 142 of the multiple peaks 140, and a distance of the data point 114 from each of the multiple peaks 140.

For example, in case the data point 114 lies within the catchment region 150 of the multiple peaks 140 from the plurality of peaks 140 of the corresponding ray 130C, the processor 120 may select the containing peak 140C from the multiple peaks 140 having the peak height 144 greater than that of the rest of the multiple peaks 140, the peak distance 142 from the sensor 110 greater than that of the rest of the multiple peaks 140, or the distance of the data point 114 less than that of the rest of the multiple peaks 140. In some other examples, the processor 120 may select the containing peak 140C from the multiple peaks 140 randomly.

Further, in some embodiments, for each data point 114 from the plurality of data points 114, the processor 120 is further configured to determine a number 146B (shown in FIG. 6) of one or more distant peaks 140D of the corresponding ray 130C. Each of the one or more distant peaks 140D includes the peak distance 142 greater than the peak distance 142 of the containing peak 140C. For example, in the illustrated embodiment of FIG. 4A, the processor 120 determines that there are two distant peaks 140D of the corresponding ray 130C having the peak distances 142 greater than the peak distance 142 of the containing peak 140C.

Figure 4B:
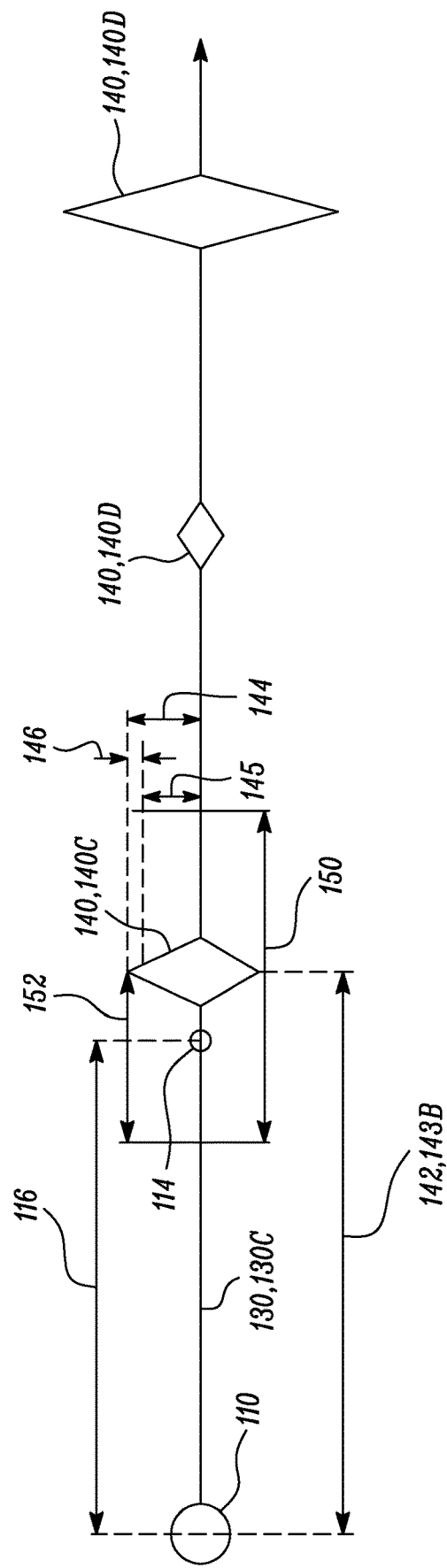
FIG. 4B illustrates a schematic representation of the corresponding ray having a plurality of peaks including a containing peak for which the data point lies within a catchment region of the containing peak, according to an embodiment of the present disclosure.

FIG. 4B illustrates a schematic representation of the corresponding ray 130 having the containing peak 140C for which the data point 114 lies within the catchment region 150 of the containing peak 140C, according to an embodiment of the present disclosure.

Now referring to FIGS. 1 to 4B, for each data point 114 from the plurality of data points 114, the processor 120 is further configured to determine a peak increment value 146. In some embodiments, the peak increment value 146 is determined based at least on the point increment base 146A shown in FIG. 6. Further, in some embodiments, the peak increment value 146 is determined based at least on the number 146B (shown in FIG. 6) of the one or more distant peaks 140D. In some embodiments, $G = B \cdot 2^{-k}$, where G is the peak increment value 146, B is the point increment base 146A, and k is the number 146B of the one or more distant peaks 140D.

This may ensure that the data point 114 farther from the sensor 110 has a greater peak increment value 146 as the static objects of the background 101 are typically the farthest in the FOV 111 of the sensor 110, and the dynamic and the semi-static objects tend to move and are visible in front of the static objects of the background 101.

For each data point 114 from the plurality of data points 114, the processor 120 is further configured to increment the peak height 144 of the containing peak 140C by the peak increment value 146. In some embodiments, if upon incrementing the peak height 144 of the containing peak 140C by the peak increment value 146, the peak height 144 exceeds the maximum peak height 144M (shown in FIG. 6) of the containing peak 140C, the processor 120 is further configured to set the peak height 144 of the containing peak 140C to the maximum peak height 144M of the containing peak 140C. As discussed above, the peak increment value 146 for the farther data points 114 may be greater than that of the closer data points 114. Thus, the point increment base 146A may be chosen such that a rate at which changes in the 3D space 105 are considered to be the background 101 is optimal.

In some embodiments, the processor 120 is further configured to update the peak distance 142 of the containing peak 140C based at least on the data point distance 116 of the data point 114 lying within the catchment region 150 of the containing peak 140C. In some embodiments, the processor 120 is further configured to define a peak location adjustment rate 142A (shown in FIG. 6) for each peak 140 from the plurality of peaks 140 for each ray 130 from the plurality of rays 130. In some embodiments, the peak location adjustment rate 142A for the peak 140 from the plurality of peaks 140 is based upon the catchment region 150 of the peak 140.

Figure 6:
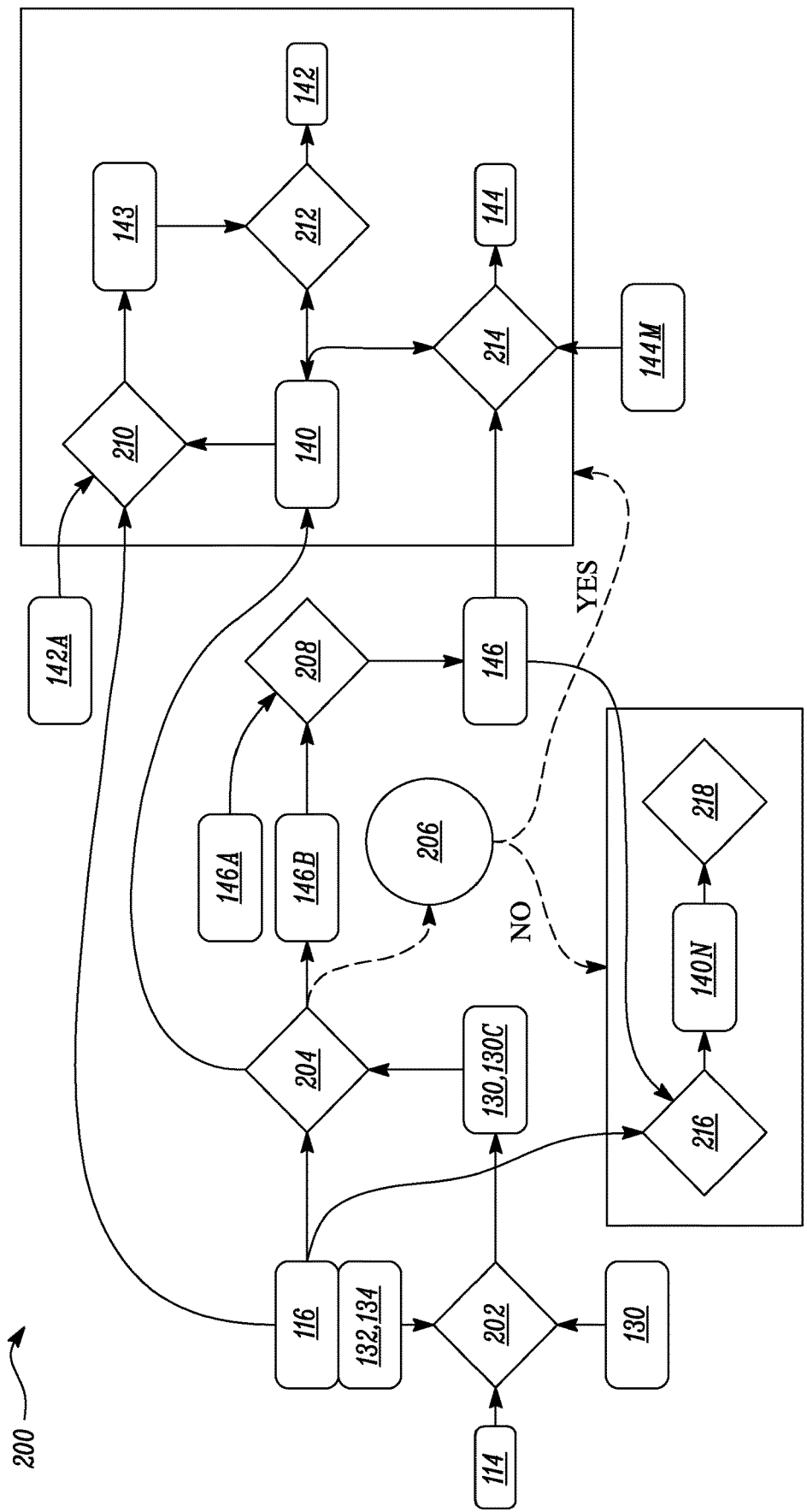
FIG. 6 illustrates a schematic flow diagram depicting various steps performed by a processor of the system for updating a peak distance and a peak height of the containing peak, according to an embodiment of the present disclosure.

In some embodiments, the peak distance 142 of the containing peak 140C is updated based on a peak shift parameter 143 (shown in FIG. 6). The peak shift parameter 143 is a product of the peak location adjustment rate 142A of the containing peak 140C and a magnitude of a difference between the peak distance 142 of the containing peak 140C and the data point distance 116 of the data point 114 lying within the catchment region 150 of the containing peak 140C. For example, the peak distance 142 of the containing peak 140C is updated from an initial peak distance 143A (shown in FIG. 4A) to an updated peak distance 143B. As is apparent from FIG. 4B, the containing peak 140C follows or moves towards the data point 114 when the peak distance 142 of the containing peak 140C is updated.

The peak location adjustment rate 142A may determine how quickly the peak distance 142 of the containing peak 140C adapts or updates based on the data point 114. The peak location adjustment rate 142A may be chosen to be small so that the containing peak 140C does not follow the dynamic object in the 3D space 105 but may also tune the peak distance 142 of the containing peak 140C for the static objects over time. In some examples, the peak location adjustment rate 142A may be equal to 0.01.

In some embodiments, for each data point 114 from the plurality of data points 114, the processor 120 is further configured to determine a backgroundness 170 (shown in FIG. 7) of the data point 114. The backgroundness 170 of the data point 114 refers to a likelihood that the data point 114 is a result of the measurement of the static object/surface in the 3D space 105. In some embodiments, as discussed above, the processor 120 may be configured to determine the backgroundness 170 for each data point 114 from the plurality of data points 114. However, in some other embodiments, the processor 120 may be configured to determine the backgroundness 170 on demand. For example, the processor 120 may be configured to determine the backgroundness 170 for specific data points 114 or at fixed intervals of the measurement. In some cases, the data points 114 having the backgroundness 170 greater than a background threshold may be reported separately or at a lower frequency than the other data points 114. In some cases, the data points 114 having the backgroundness 170 greater than a background threshold may be reported only when there is a significant change in the backgroundness 170. This may further reduce an average communication bandwidth required by the system 100.

In some embodiments, the processor 120 is further configured to determine the backgroundness 170 of the data point 114 based at least on the peak height 144, the peak distance 142, and the catchment distance 152 of the catchment region 150 for the containing peak 140C if the data point 114 lies within the catchment region 150 of the containing peak 140C.

In some embodiments, the backgroundness 170 is determined further based on a magnitude of a difference between the data point distance 116 and the peak distance 142 of the containing peak 140C. In other words, the backgroundness 170 may be determined further based on a closeness of the data point 114 and the containing peak 140C. In some embodiments, the processor 120 is further configured to determine the backgroundness 170 of the data point 114 based on the maximum peak height 144M of the containing peak 140C if the data point 114 lies within the catchment region 150 of the containing peak 140C.

The system 100 may provide accurate and real-time estimates for the backgroundness 170 of the data point 114. In other words, the system 100 may provide accurate and real-time estimates for the likelihood of the data point 114 belonging to either the static object/surfaces or to dynamic objects, including when the dynamic objects may be moving discontinuously (e.g., the dynamic object may stop for periods of time).

Figure 4C:
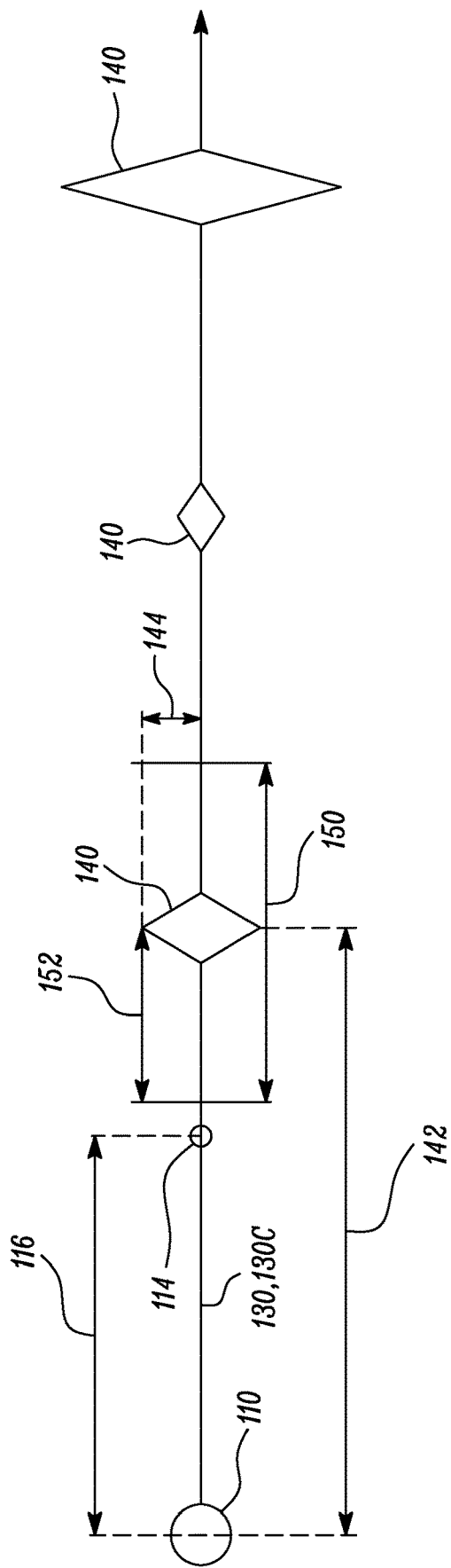
FIG. 4C illustrates a schematic representation of the corresponding ray of the data point, while the data point is outside the catchment region of each of the plurality of peaks of the corresponding ray, according to an embodiment of the present disclosure.
Figure 4D:
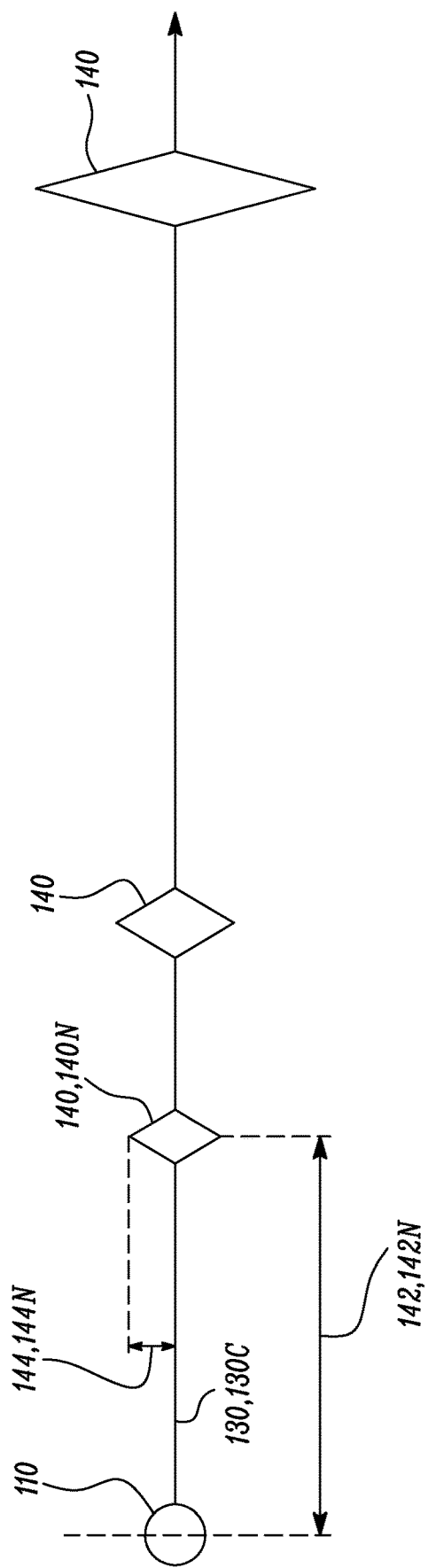
FIG. 4D illustrates a schematic representation of the corresponding ray including a new peak, according to an embodiment of the present disclosure.

FIG. 4C illustrates a schematic representation of the corresponding ray 130C of the data point 114, while the data point 114 is outside the catchment region 150 of each of the plurality of peaks 140 of the corresponding ray 130C, according to an embodiment of the present disclosure. FIG. 4D illustrates a schematic representation of the corresponding ray 130C including a new peak 140N, according to an embodiment of the present disclosure.

Referring to FIGS. 2, 4C, and 4D, for each data point 114 from the plurality of data points 114, the processor 120 is further configured to define the new peak 140N including a peak height 144N equal to the peak increment value 146 and a peak distance 142N equal to the data point distance 116 if the data point 114 is outside the catchment region 150 of each of the plurality of peaks 140 of the corresponding ray 130C.

In some embodiments, in order to define the new peak 140N, the processor 120 is further configured to remove the peak 140 from the plurality of peaks 140 including the peak height 144 less than the peak height 144 of each of the other peaks 140 from the plurality of peaks 140 of the corresponding ray 130C.

In some embodiments, the processor 120 is further configured to set the backgroundness 170 (shown in FIG. 7) equal to zero if the data point 114 is outside the catchment region 150 of each of the plurality of peaks 140 of the corresponding ray 130C. In other words, the processor 120 determines that the data point 114 outside the catchment region 150 of each of the plurality of peaks 140 of the corresponding ray 130C does not to belong to any static object. Therefore, the system 100 may not require high computational or memory intensive resources.

Figure 4E:
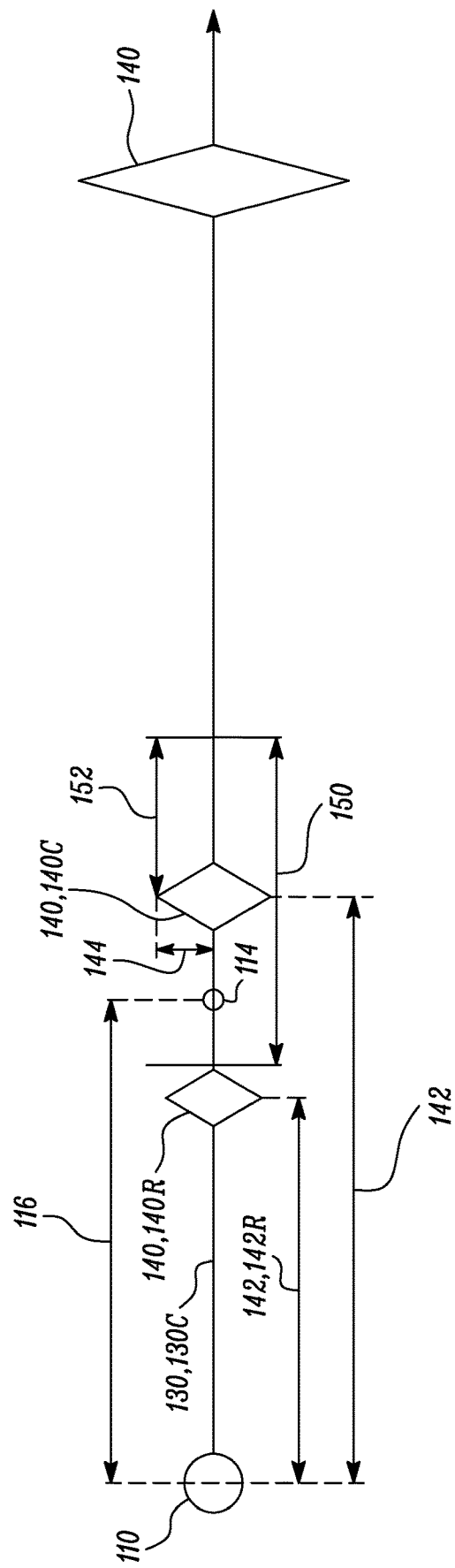
FIG. 4E illustrates a schematic representation of the corresponding ray including a skipped peak, according to an embodiment of the present disclosure.

FIG. 4E illustrates a schematic representation of the corresponding ray 130C including a skipped peak 140R, according to an embodiment of the present disclosure.

In some embodiments, if the data point 114 lies within the catchment region 150 of the containing peak 140C, the processor 120 is further configured to mark the containing peak 140C as an improved data point. Therefore, the data points 114 of the measurements of the static objects or surfaces that are currently visible to the sensor 110 may be improved using the information of peaks 140 (for example, the peak distances 142). Specifically, the improved data points may help to reduce measurement noise from the sensor 110.

In some embodiments, the processor 120 is further configured to mark one or more peaks 140 from the plurality of peaks 140 of the corresponding ray 130C as the skipped peaks 140R for which the peak distance 142 is less than the data point distance 116 of the data point 114. In some embodiments, the processor 120 marks the one or more peaks 140 from the plurality of peaks 140 of the corresponding ray 130C as the skipped peaks 140R for one measurement or one instance of the algorithm. For example, the processor 120 may mark the skipped peaks 140R as its peak distance 142R is less than the data point distance 116 of the data point 114 for the one measurement or one instance of the algorithm. In some embodiments, the processor 120 marks the one or more peaks 140 from the plurality of peaks 140 of the corresponding ray 130C as the skipped peaks 140R for the one measurement or one instance of the algorithm.

In some embodiments, if the data point 114 lies within the catchment region 150 of the containing peak 140C, and if the peak 140 from the plurality of peaks 140 of the corresponding ray 130C is not marked as the skipped peak 140R and the peak height 144 of the peak 140 is greater than a quality threshold, the processor 120 is further configured to mark the peak 140 as a virtual data point. Specifically, the skipped peaks 140R may not be reported as the virtual data points for the one measurement or one instance of the algorithm. For example, in the illustrated embodiment of FIG. E, the skipped peak 140R may not be reported as the virtual data point.

The improved data points and the virtual data points may help the system 100 to recognize the static objects or the background 101 that may be temporarily hidden from the view of the sensor 110 but were in the FOV 111 of the sensor 110 in the past. This may increase the accuracy and reliability of the system 100 and decrease noise in the measurement of the sensor 110. In other words, the improved data points and virtual data points may enrich data from the sensor 110 provided to the subsequent modules (e.g., the object detection module 190 shown in FIG. 2).

Figure 5A:
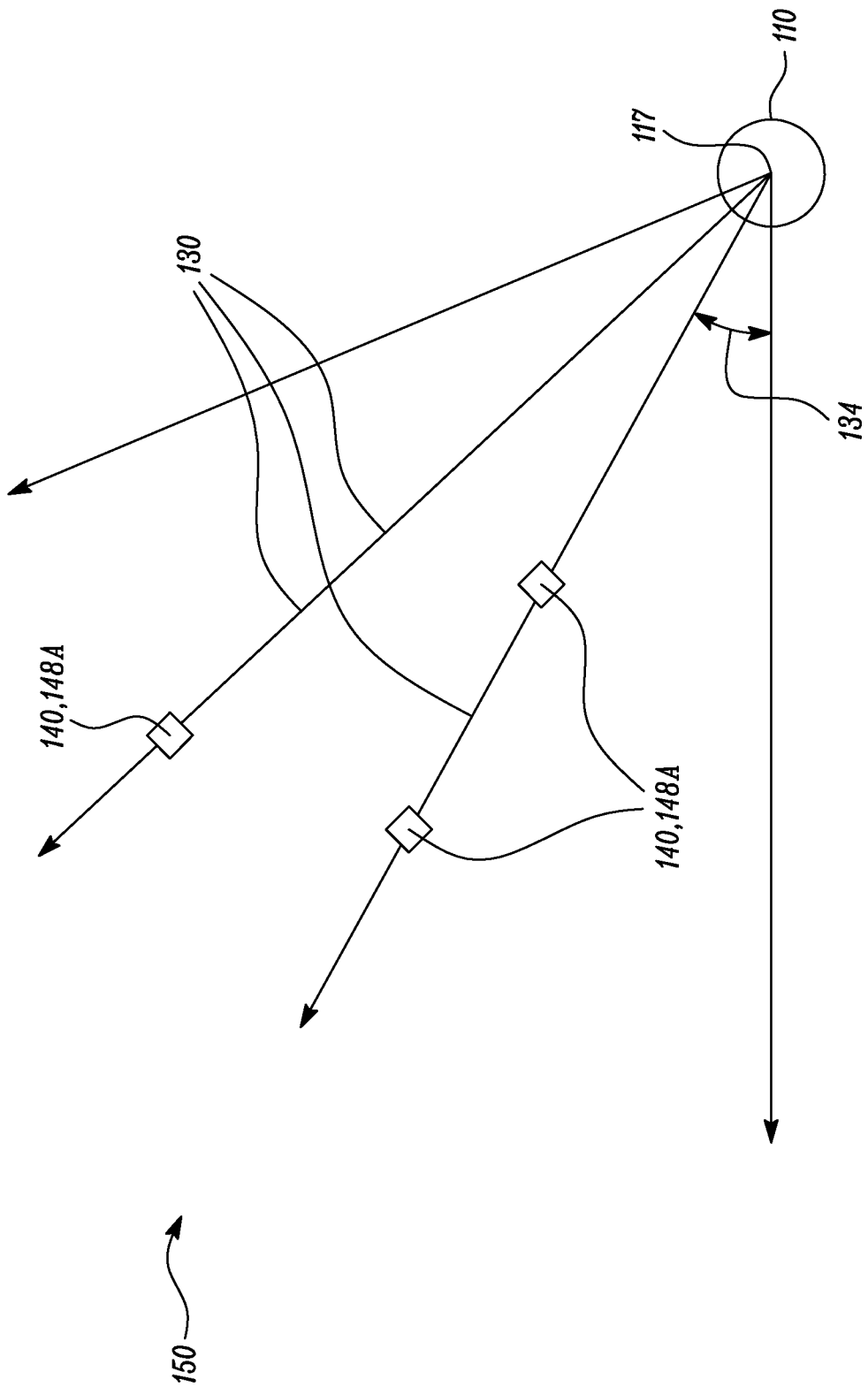
FIG. 5A illustrates a schematic view of the sensor in an initial position, according to an embodiment of the present disclosure.
Figure 5B:
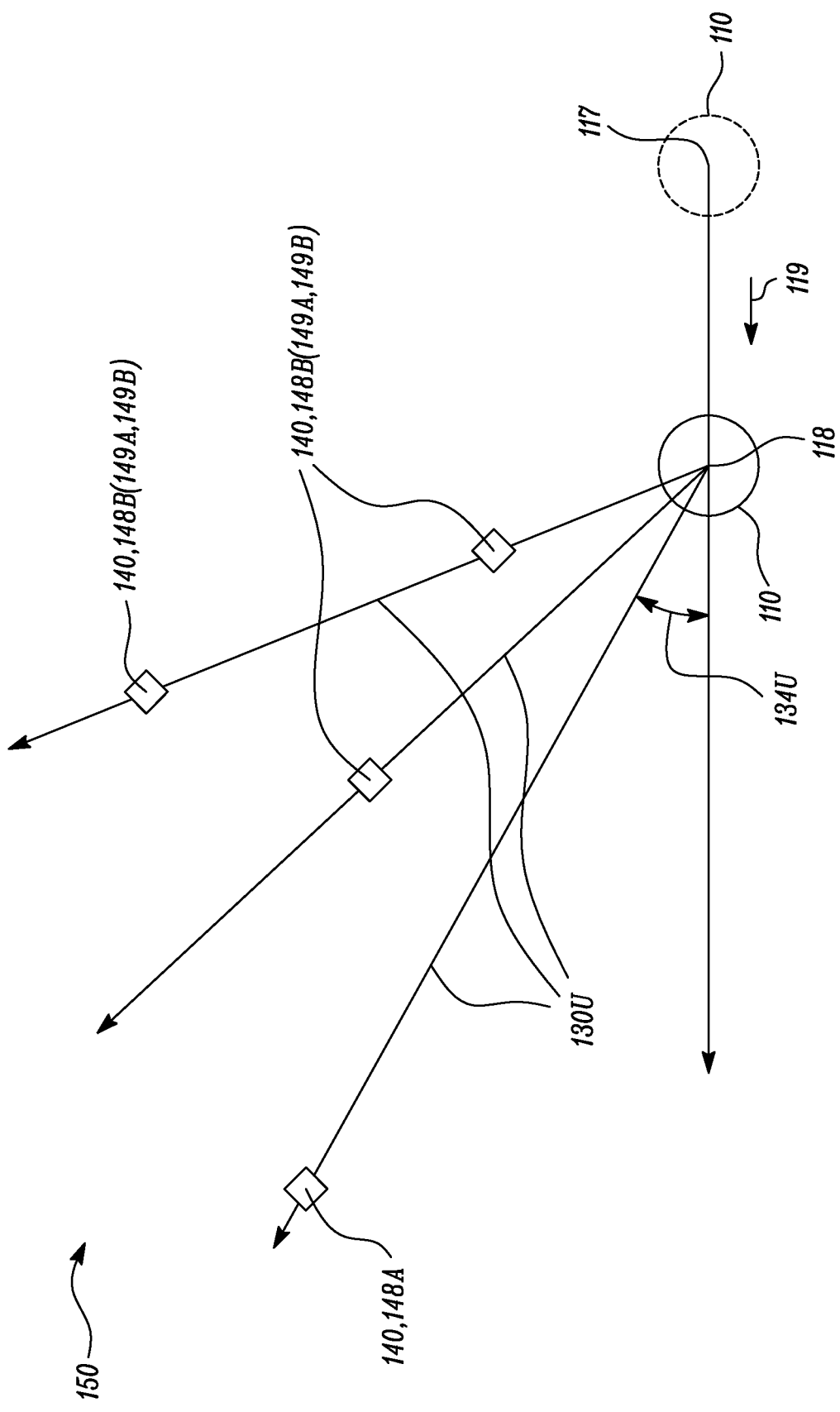
FIG. 5B illustrates a schematic view of the sensor in a different position, according to an embodiment of the present disclosure.
Figure 5C:
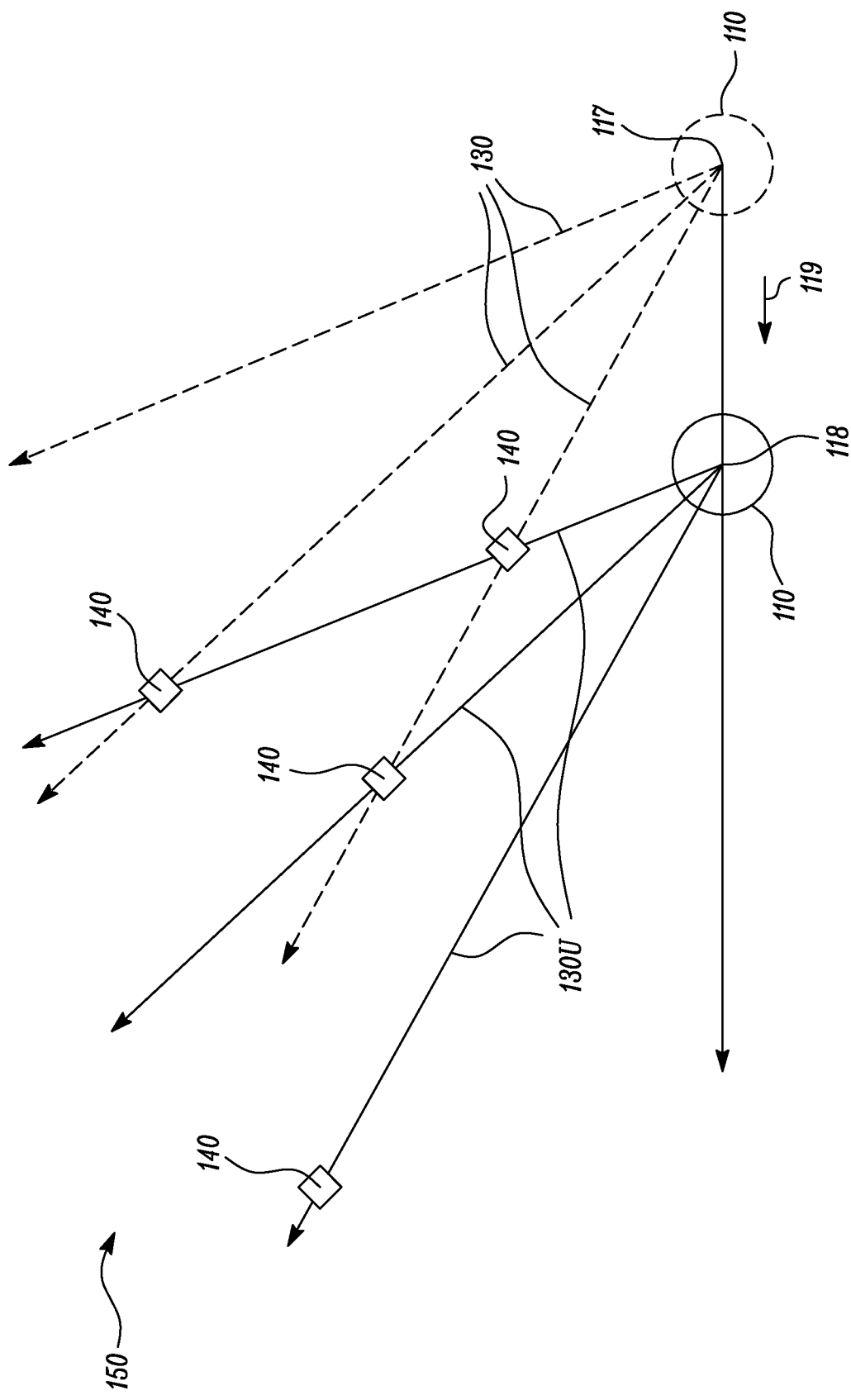
FIG. 5C illustrates a schematic view of the plurality of rays and a plurality of updated rays when the sensor is in the initial position and in the different position, respectively, according to an embodiment of the present disclosure.

FIG. 5A illustrates a schematic view of the sensor 110 in an initial position 117, according to an embodiment of the present disclosure. FIG. 5B illustrates a schematic view of the sensor 110 in a different position 118, according to an embodiment of the present disclosure. FIG. 5C illustrates a schematic view of the plurality of rays 130 and a plurality of updated rays 130U when the sensor 110 is in the initial position 117 and in the different position 118, respectively, according to an embodiment of the present disclosure.

Referring to FIGS. 1-5C, in some embodiments, the processor 120 is configured to divide the 3D space 105 into the plurality of updated rays 130U extending from the sensor 110 when the sensor 110 moves to the different position 118. Specifically, the processor 120 is configured to divide the 3D space 105 into the plurality of updated rays 130U extending from the sensor 110 when the sensor 110 moves to the different position 118 from the initial position 117. Each updated ray 130U includes an updated azimuth (not shown) and an updated elevation 134U with respect to the sensor 110 in the different position 118.

Further, the processor 120 is configured to obtain a displacement parameter 119. The displacement parameter 119 is indicative of a movement of the sensor 110 to the different position 118. In some embodiments, the displacement parameter 119 may be indicative of a relative motion of the sensor 110. In some embodiments, the sensor 110 itself may provide the displacement parameter 119. In some other embodiments, an external device (not shown) may provide the displacement parameter 119. The processor 120 may obtain the displacement parameter 119 at each timestep or update rate of the algorithm.

The processor 120 is further configured to determine an initial peak position 148A (shown in FIG. 5A) of each of the plurality of peaks 140 for each ray 130 from the plurality of rays 130 based on the peak distance 142 (shown in FIG. 4A) of the corresponding peak 140, and the azimuth 132 (shown in FIG. 3) and the elevation 134 (shown in FIG. 3) of the corresponding ray 130C with respect to the sensor 110. The initial peak position 148A may be determined in cartesian coordinates. The static objects in the 3D space 105 that generate the peaks 140 are typically static with respect to the 3D space 105, while the sensor 110 may move through the 3D space 105. Hence, the peaks 140 may also be assumed to have a constant location in the 3D space 105.

Further, the processor 120 is configured to determine an updated peak position 148B (shown in FIG. 5B) of each of the plurality of peaks 140 for each ray 130 from the plurality of rays 130 based on a difference between the initial peak position 148A and the displacement parameter 119. This is because the peaks 140 may move with respect to the sensor 110 in an exactly opposite direction as the direction along which the sensor 110 moves through the 3D space 105.

Furthermore, the processor 120 is configured to determining a peak azimuth 149A (shown in brackets) and a peak elevation 149B (shown in brackets) of each of the plurality of peaks 140 for each ray 130 from the plurality of rays 130 based on the updated peak position 148B. The processor 120 is configured to reposition each of the plurality of peaks 140 to the plurality of updated rays 130U based on the peak azimuth 149A and the peak elevation 149B.

Repositioning each of the plurality of peaks 140 to the plurality of updated rays 130U may make the system 100 applicable for applications in which the sensor 110 may be moving. Therefore, the system 100 may determine the background 101 if the sensor 110 is static or moving. In some examples, the sensor 110 may be mounted on a moving vehicle. In some embodiments, the moving vehicle may be an autonomous vehicle.

In some embodiments, if one or more updated rays 130U from the plurality of updated rays 130U include more than a number N of the peaks 140 defined for each updated ray 130U, the processor 120 is configured to remove one or more peaks 140 from the plurality of peaks 140 of each of the one or more updated rays 130U, such that each of the one or more updated rays 130U includes the number N of the peaks 140 defined for each updated ray 130U. Each of the one or more peaks 140 that are removed includes the peak height 144 less than the peak heights 144 of the other peaks 140 from the plurality of peaks 140 of the corresponding updated ray 130U from the one or more updated rays 130U. In some embodiments, the processor 120 is further configured to update the maximum peak height 144M for each of the remaining peaks 140 of each of the one or more updated rays 130U based on the peak distance 142 of each of the remaining peaks 140.

Figure 7:
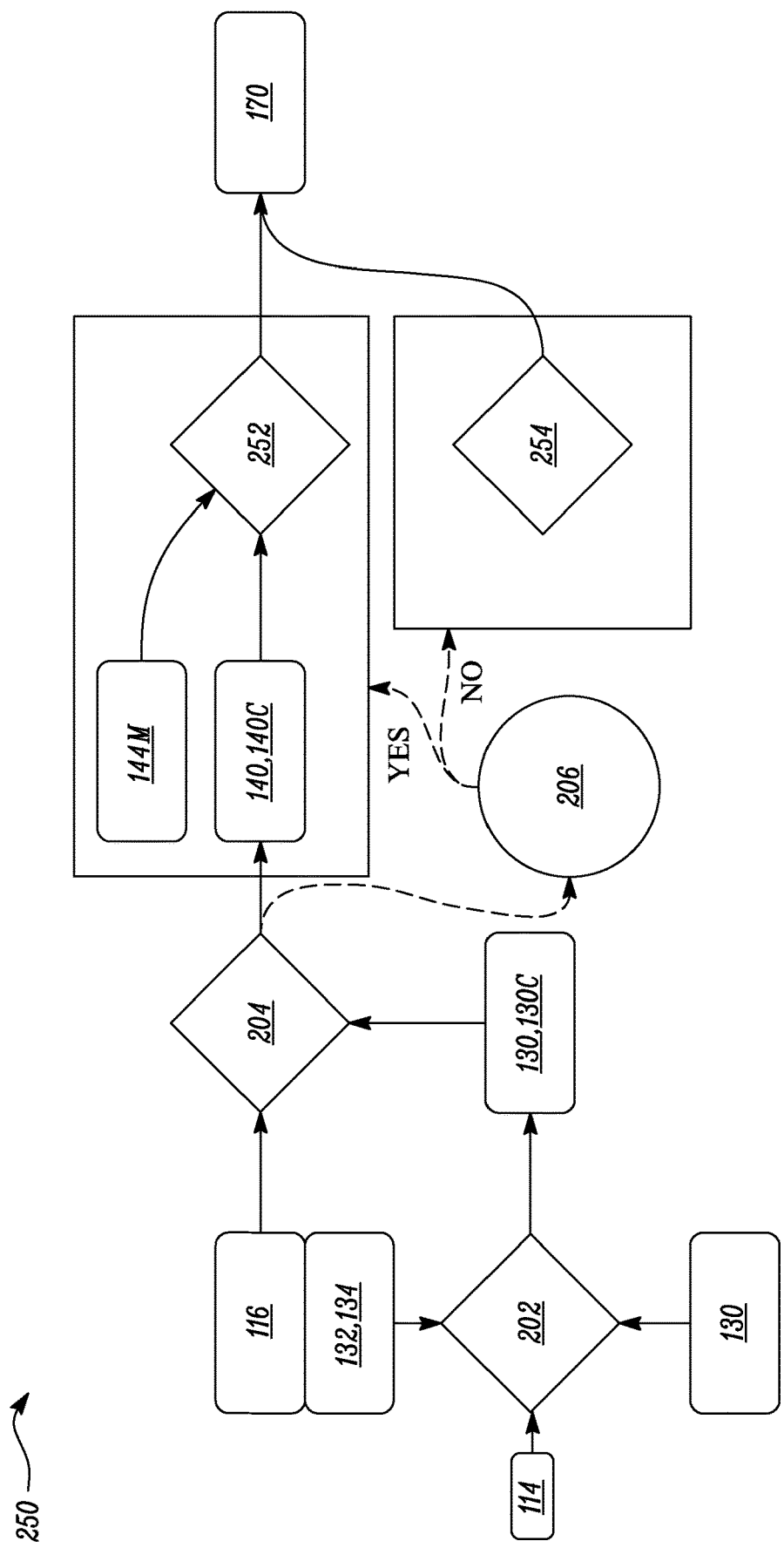
FIG. 7 illustrates a schematic flow diagram depicting various steps performed by the processor for determining a backgroundness of the data point, according to an embodiment of the present disclosure.
Figure 8:
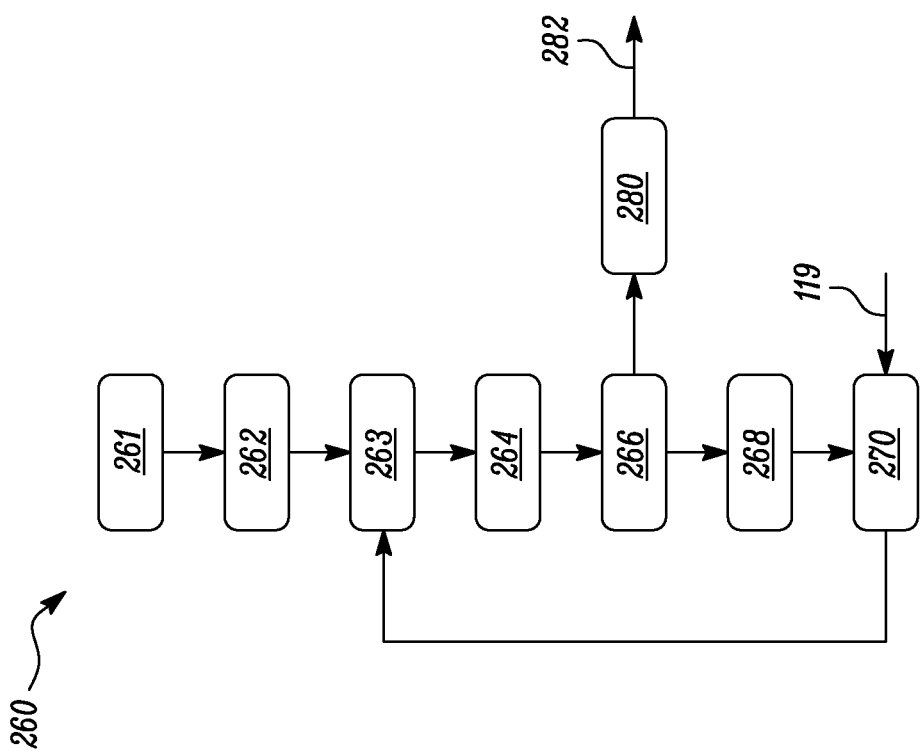
FIG. 8 illustrates a schematic flow diagram depicting various steps performed by the system for determining the background in the 3D space, according to an embodiment of the present disclosure.

FIG. 6 illustrates a schematic flow diagram 200 depicting various steps performed by the processor 120 shown in FIG. 2 for updating the peak distance 142 and the peak height 144 of the containing peak 140C, according to an embodiment of the present disclosure. FIG. 7 illustrates a schematic flow diagram 250 depicting various steps performed by the processor 120 shown in FIG. 2 for determining the backgroundness 170 of the data point 114, according to an embodiment of the present disclosure. FIG. 8 illustrates a schematic flow diagram 260 depicting various steps performed by the system 100 shown in FIG. 2 for determining the background 101 (shown in FIG. 1) in the 3D space 105 (shown in FIG. 1), according to an embodiment of the present disclosure.

Figure 9:
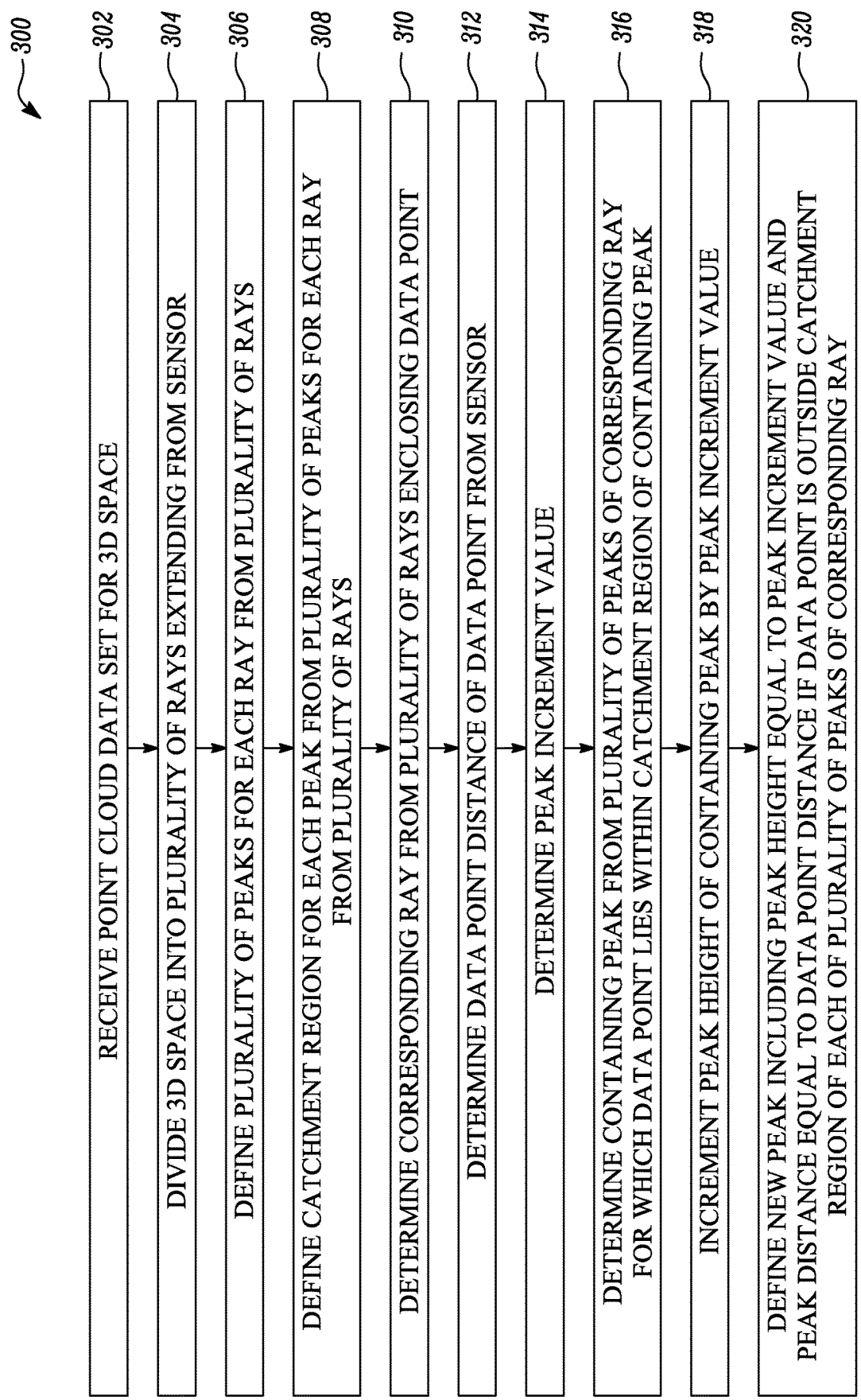
FIG. 9 illustrates a flowchart depicting a method for determining the background in the 3D space, according to an embodiment of the present disclosure.

FIG. 9 illustrates a flowchart depicting a method 300 for determining the background 101 (shown in FIG. 1) in the 3D space 105 (shown in FIG. 1), according to an embodiment of the present disclosure. The method 300 will be further described with reference to FIGS. 1 to 8.

At step 302, the method 300 includes receiving, via the sensor 110, the point cloud data set 112 for the 3D space 105. The point cloud data set 112 includes the plurality of data points 114.

At step 304, the method 300 includes dividing the 3D space 105 into the plurality of rays 130 extending from the sensor 110. Each ray 130 includes the azimuth 132 and the elevation 134 with respect to the sensor 110. Each data point 114 is enclosed by the corresponding ray 130C from the plurality of rays 130.

At block 261 of the flow diagram 260 of FIG. 8, the method 300 starts. Specifically, the step 304 of the method 300 may be followed by the block 261 of FIG. 8.

At step 306, the method 300 includes defining the plurality of peaks 140 for each ray 130 from the plurality of rays 130. Each peak 140 from the plurality of peaks 140 is located at the peak distance 142 from the sensor 110 and includes the peak height 144 equal to the predetermined initial value 145.

At step 308, the method 300 includes defining the catchment region 150 for each peak 140 from the plurality of peaks 140 for each ray 130 from the plurality of rays 130. The catchment region 150 for each peak 140 includes the catchment distance 152 from the corresponding peak 140 towards the sensor 110 and the catchment distance 152 from the corresponding peak 140 away from the sensor 110.

In some embodiments, the method 300 further includes defining the maximum peak height 144M for each peak 140 from the plurality of peaks 140 for each ray 130 from the plurality of rays 130, such that the peak 140 from the plurality of peaks 140 of the ray 130 from the plurality of rays 130 including the peak distance 142 greater than the peak distance 142 of another peak 140 from the plurality of peaks 140 of the ray 130 has the maximum peak height 144M greater than the maximum peak height 144M of the other peak 140.

In some embodiments, the method 300 further includes defining the point increment base 146A for each peak 140 from the plurality of peaks 140 for each ray 130 from the plurality of rays 130. The peak 140 from the plurality of peaks 140 including the peak distance 142 greater than the peak distance 142 of another peak 140 from the plurality of peaks 140 of the ray 130 has the point increment base 146A greater than point increment base 146A of the other peak 140.

At block 262 of the flow diagram 260 of FIG. 8, the method 300 is initialized. Specifically, the block 262 includes the steps 306 and 308 of the method 300.

Further, at block 263 of the flow diagram 260 of FIG. 8, the method 300 receives new measurement. Specifically, the block 263 includes the step 302 of the method 300.

At step 310, the method 300 includes, for each data point 114 from the plurality of data points 114, determining the corresponding ray 130C from the plurality of rays 130 enclosing the data point 114 (shown in block 202 of FIG. 6).

At step 312, the method 300 includes, for each data point 114 from the plurality of data points 114, determining the data point distance 116 of the data point 114 from the sensor 110.

In the illustrated embodiment of FIG. 6, the corresponding ray 130C from the plurality of rays 130 enclosing the data point 114 from the plurality of rays 130 is determined based on the data point distance 116 of the data point 114, the azimuth 132, and the elevation 134.

At step 314, the method 300 includes, for each data point 114 from the plurality of data points 114, determining the peak increment value 146 (shown in block 208 of FIG. 6).

In some embodiments, the peak increment value 146 is determined based at least on the point increment base 146A. In some embodiments, for each data point 114 from the plurality of data points 114, the method 300 further includes determining the number 146B of one or more distant peaks 140D of the corresponding ray 130C, each of the one or more distant peaks 140D includes the peak distance 142 greater than the peak distance 142 of the containing peak 140C. In some embodiments, the peak increment value 146 is determined based at least on the number 146B of the one or more distant peaks 140D.

At step 316, the method 300 includes, for each data point 114 from the plurality of data points 114, determining the containing peak 140C from the plurality of peaks 140 of the corresponding ray 130C for which the data point 114 lies within the catchment region 150 of the containing peak 140C (shown in block 204 of FIG. 6).

In some embodiments, in case the data point 114 lies within the catchment region 150 of the multiple peaks 140 from the plurality of peaks 140 of the corresponding ray 130C, the containing peak 140C is determined based on at least one of the peak heights 144 of the multiple peaks 140, the peak distances 142 of the multiple peaks 140, and the distance of the data point 114 from each of the multiple peaks 140.

Block 206 of FIG. 6 illustrates two different paths in which the method 300 may proceed if the containing peak 140C exists or does not exist for the data point 114. Specifically, at block 206, "YES" refers to a case in which the containing peak 140C exists for the data point 114 and "NO" refers to a case in which the containing peak 140C does not exist for the data point 114.

At step 318, the method 300 includes, for each data point 114 from the plurality of data points 114, incrementing the peak height 144 of the containing peak 140C by the peak increment value 146 (shown in block 214 of FIG. 6).

In some embodiments, if upon incrementing the peak height 144 of the containing peak 140C by the peak increment value 146, the peak height 144 exceeds the maximum peak height 144M of the containing peak 140C, the method 300 further includes setting the peak height 144 of the containing peak 140C to the maximum peak height 144M of the containing peak 140C.

At step 320, the method 300 includes, for each data point 114 from the plurality of data points 114, defining the new peak 140N including the peak height 144N equal to the peak increment value 146 and the peak distance 142N equal to the data point distance 116 if the data point 114 is outside the catchment region 150 of each of the plurality of peaks 140 of the corresponding ray 130C (shown in block 216 of FIG. 6).

In some embodiments, defining the new peak 140N further includes removing the peak 140 from the plurality of peaks 140 including the peak height 144 less than the peak height 144 of each of the other peaks 140 from the plurality of peaks 140 of the corresponding ray 130C (shown in block 218 of FIG. 6).

In some embodiments, the method 300 further includes updating the peak distance 142 of the containing peak 140C based at least on the data point distance 116 of the data point 114 lying within the catchment region 150 of the containing peak 140C (shown in block 212 of FIG. 6).

In some embodiments, the method 300 includes defining the peak location adjustment rate 142A for each peak 140 from the plurality of peaks 140 for each ray 130 from the plurality of rays 130 (shown in block 210 of FIG. 6). The peak location adjustment rate 142A for the peak 140 from the plurality of peaks 140 is based upon the catchment region 150 of the peak 140. The peak distance 142 of the containing peak 140C is updated further based on the peak shift parameter 143. In some embodiments, the peak shift parameter 143 is a product of the peak location adjustment rate 142A of the containing peak 140C and the magnitude of the difference between the peak distance 142 of the containing peak 140C and the data point distance 116 of the data point 114 lying within the catchment region 150 of the containing peak 140C.

At block 264 of the flow diagram 260 of FIG. 8, the method 300 collects data. Specifically, the block 264 includes the steps 310, 312, 314, 316, 318, and 320 of the method 300.

At block 266 of the flow diagram 260 of FIG. 8, the method 300 estimates the backgroundness 170. In some embodiments, for each data point 114 from the plurality of data points 114, the method 300 further includes determining the backgroundness 170 of the data point 114 (shown in the flow diagram 250 of FIG. 7).

In some embodiments, determining the backgroundness 170 of the data point 114 further includes determining the backgroundness 170 of the data point 114 based at least on the peak height 144, the peak distance 142, and the catchment distance 152 of the catchment region 150 for the containing peak 140C if the data point 114 lies within the catchment region 150 of the containing peak 140C (shown in block 252 of FIG. 7).

In some embodiments, the backgroundness 170 is determined further based on the magnitude of the difference between the data point distance 116 and the peak distance 142 of the containing peak 140C. In some embodiments, the backgroundness 170 of the data point 114 is determined further based on the maximum peak height 144M of the containing peak 140C if the data point 114 lies within the catchment region 150 of the containing peak 140C.

In some embodiments, determining the backgroundness 170 of the data point 114 further includes setting the backgroundness 170 equal to zero if the data point 114 is outside the catchment region 150 of each of the plurality of peaks 140 of the corresponding ray 130C (shown in block 254 of FIG. 7).

At block 280 of the flow diagram 260 of FIG. 8, the method 300 determines the improved data point and the virtual data point to generate enriched data 282.

In some embodiments, the method 300 further includes marking the one or more peaks 140 from the plurality of peaks 140 of the corresponding ray 130C as the skipped peaks 140R for which the peak distance 142 is less than the data point distance 116 of the data point 114.

In some embodiments, the method 300 further includes, if the data point 114 lies within the catchment region 150 of the containing peak 140C, marking the containing peak 140C as the improved data point. In some embodiments, the method 300 further includes, if the data point 114 lies within the catchment region 150 of the containing peak 140C, and if the peak 140 from the plurality of peaks 140 of the corresponding ray 130C is not marked as the skipped peak 140R and the peak height 144 of the peak 140 is greater than the quality threshold, marking the peak 140 as the virtual data point.

At block 268 of the flow diagram 260 of FIG. 8, the method 300 decays or decreases the peak height 144 of each of the plurality of peaks 140 of each of the plurality of rays 130 by a predetermined value. For example, the predetermined value may be equal to one, i.e., the peak height 144-1. As the peak height 144 may not be negative, the method 300 may determine if the peak height 144 is greater than or equal to one. If the peak height 144 is greater than or equal to one, the method 300 may decrease the peak height by one. If the peak height 144 is less than one, the method 300 may set the peak height 144 to zero.

At block 270 of the flow diagram 260 of FIG. 8, the method 300 repositions each of the plurality of peaks 140 based on the displacement parameter 119.

In some embodiments, the method 300 further includes dividing the 3D space 105 into the plurality of updated rays 130U extending from the sensor 110 when the sensor 110 moves to the different position 118. Each updated ray 130U includes the updated azimuth and the updated elevation 134U with respect to the sensor 110 in the different position 118. In some embodiments, the method 300 further includes obtaining the displacement parameter 119. The displacement parameter 119 is indicative of the movement of the sensor 110 to the different position 118.

In some embodiments, the method 300 further includes determining the initial peak position 148A of each of the plurality of peaks 140 for each ray 130 from the plurality of rays 130 based on the peak distance 142 of the corresponding peak 140, and the azimuth 132 and the elevation 134 of the corresponding ray 130C with respect to the sensor 110. In some embodiments, the method 300 further includes determining the updated peak position 148B of each of the plurality of peaks 140 for each ray 130 from the plurality of rays 130 based on the difference between the initial peak position 148A and the displacement parameter 119.

In some embodiments, the method 300 further includes determining the peak azimuth 149A and the peak elevation 149B of each of the plurality of peaks 140 for each ray 130 from the plurality of rays 130 based on the updated peak position 148B. In some embodiments, the method 300 further includes repositioning each of the plurality of peaks 140 to the plurality of updated rays 130U based on the peak azimuth 149A and the peak elevation 149B.

In some embodiments, the method 300 further includes, if the one or more updated rays 130U from the plurality of updated rays 130U include more than the number N of the peaks 140 defined for each updated ray 130U, removing one or more peaks 140 from the plurality of peaks 140 of each of the one or more updated rays 130U, such that each of the one or more updated rays 130U includes the number N of the peaks 140 defined for each updated ray 130U. Each of the one or more peaks 140 that are removed includes the peak height 144 less than the peak heights 144 of the other peaks 140 from the plurality of peaks 140 of the corresponding updated ray 130U from the one or more updated rays 130U.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), tensor processing units (TPUs), neuromorphic chips, vector accelerators, or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

LIST OF ELEMENTS

A Computing Device
B Computing Device
100 System
101 Background
105 Three-Dimensional (3D) Space
110 Sensor
111 Field of View
112 Point Cloud Data Set
114 Data Point
116 Data Point Distance
116A Data Point Distance
117 Initial Position
118 Different Position
119 Displacement Parameter
120 Processor
125 Output
130 Rays
130C Corresponding Ray
130U Updated Rays
132 Azimuth
134 Elevation
134U Updated Elevation
140 Peak
140C Containing Peak
140D Distant Peak
140N New Peak
140R Skipped Peak
142 Peak Distance
142R Peak Distance
142A Peak Location Adjustment Rate
142N Peak Distance
143 Peak Shift Parameter
143A Initial Peak Distance
143B Updated Peak Distance
144 Peak Height
144M Maximum Peak Height
144N Peak Height
145 Predetermined Initial Value
146 Peak Increment Value
146A Point Increment Base
146B Number of Higher Peaks
148A Initial Peak Position
148B Updated Peak Position
149A Peak Azimuth
149B Peak Elevation
150 Catchment Region
152 Catchment Distance
170 Backgroundness
180 Point Cloud Fusion Module
185 Fused Cloud Data Set
190 Object Detection Module
195 Perception Output
200 Flow Diagram
202 Block
204 Block
206 Block
208 Block
210 Block
212 Block
214 Block
216 Block
218 Block
250 Flow Diagram
252 Block
254 Block
260 Flow Diagram
261 Block
262 Block
263 Block
264 Block
266 Block
268 Block
270 Block
280 Block
282 Enriched Data
300 Method
302 Step
304 Step
304 Step
306 Step
308 Step
310 Step
312 Step
314 Step
316 Step
314 Step
318 Step
320 Step

The invention claimed is:

1. A method for determining a background in a three-dimensional (3D) space, the method comprising:
receiving, via a sensor, a point cloud data set for the 3D space, wherein the point cloud data set comprises a plurality of data points;
dividing the 3D space into a plurality of rays extending from the sensor, wherein each ray comprises an azimuth and an elevation with respect to the sensor, and wherein each data point is enclosed by a corresponding ray from the plurality of rays;
defining a plurality of peaks for each ray from the plurality of rays, wherein each peak from the plurality of peaks is located at a peak distance from the sensor and comprises a peak height equal to a predetermined initial value; and
defining a catchment region for each peak from the plurality of peaks for each ray from the plurality of rays, wherein the catchment region for each peak comprises a catchment distance from the corresponding peak towards the sensor and the catchment distance from the corresponding peak away from the sensor;
wherein, for each data point from the plurality of data points, the method further comprises:
determining the corresponding ray from the plurality of rays enclosing the data point; determining a data point distance of the data point from the sensor; determining a peak increment value;

determining a containing peak from the plurality of peaks of the corresponding ray for which the data point lies within the catchment region of the containing peak;

incrementing the peak height of the containing peak by the peak increment value;

defining a new peak comprising a peak height equal to the peak increment value and a peak distance equal to the data point distance if the data point is outside the catchment region of each of the plurality of peaks of the corresponding ray; and determining a backgroundness of the data point, and the backgroundness is determined based on a magnitude of a difference between the data point distance and the peak distance of the containing peak.

2. The method of claim 1, wherein determining the backgroundness of the data point further comprises:

setting the backgroundness equal to zero if the data point is outside the catchment region of each of the plurality of peaks of the corresponding ray; and determining the backgroundness of the data point based at least on the peak height, the peak distance, and the catchment distance of the catchment region for the containing peak if the data point lies within the catchment region of the containing peak.

3. The method of claim 2, further comprising defining a maximum peak height for each peak from the plurality of peaks for each ray from the plurality of rays, such that a peak from the plurality of peaks of a ray from the plurality of rays comprising the peak distance greater than the peak distance of another peak from the plurality of peaks of the ray has the maximum peak height greater than the maximum peak height of the other peak.

4. The method of claim 3, wherein, if upon incrementing the peak height of the containing peak by the peak increment value, the peak height exceeds the maximum peak height of the containing peak, the method further comprises setting the peak height of the containing peak to the maximum peak height of the containing peak.

5. The method of claim 3, further comprising:

dividing the 3D space into a plurality of updated rays extending from the sensor when the sensor moves to a different position, wherein each updated ray comprises an updated azimuth and an updated elevation with respect to the sensor in the different position;

obtaining a displacement parameter, wherein the displacement parameter is indicative of the movement of the sensor to the different position;

determining an initial peak position of each of the plurality of peaks for each ray from the plurality of rays based on the peak distance of the corresponding peak and the azimuth and the elevation of the corresponding ray with respect to the sensor;

determining an updated peak position of each of the plurality of peaks for each ray from the plurality of rays based on a difference between the initial peak position and the displacement parameter;

determining a peak azimuth and a peak elevation of each of the plurality of peaks for each ray from the plurality of rays based on the updated peak position; and repositioning each of the plurality of peaks to the plurality of updated rays based on the peak azimuth and the peak elevation.

6. The method of claim 5, further comprising:

if one or more updated rays from the plurality of updated rays comprise more than a number of peaks defined for each updated ray, removing one or more peaks from the plurality of peaks of each of the one or more updated rays, such that each of the one or more updated rays comprises the number of peaks defined for each updated ray, and wherein each of the one or more peaks that are removed comprises the peak height less than the peak heights of the other peaks from the plurality of peaks of the corresponding updated ray from the one or more updated rays; and updating the maximum peak height for each of the remaining peaks of each of the one or more updated rays based on the peak distance of each of the remaining peaks.

7. The method of claim 1, wherein, in case the data point lies within the catchment region of multiple peaks from the plurality of peaks of the corresponding ray, the containing peak is determined based on at least one of the peak heights of the multiple peaks, the peak distances of the multiple peaks, and a distance of the data point from each of the multiple peaks.

8. The method of claim 3, wherein the backgroundness of the data point is determined further based on the maximum peak height of the containing peak if the data point lies within the catchment region of the containing peak.

9. The method of claim 1, further comprising defining a point increment base for each peak from the plurality of peaks for each ray from the plurality of rays, wherein a peak from the plurality of peaks comprising the peak distance greater than the peak distance of another peak from the plurality of peaks of the ray has the point increment base greater than point increment base of the other peak, and wherein the peak increment value is determined based at least on the point increment base.

10. The method of claim 1, wherein, for each data point from the plurality of data points, the method further comprises determining a number of one or more distant peaks of the corresponding ray, each of the one or more distant peaks comprising the peak distance greater than the peak distance of the containing peak, and wherein the peak increment value is determined based at least on the number of the one or more distant peaks.

11. The method of claim 1, wherein defining the new peak further comprises removing a peak from the plurality of peaks comprising the peak height less than the peak height of each of the other peaks from the plurality of peaks of the corresponding ray.

12. The method of claim 1, further comprises updating the peak distance of the containing peak based at least on the data point distance of the data point lying within the catchment region of the containing peak.

13. The method of claim 12, further comprising defining a peak location adjustment rate for each peak from the plurality of peaks for each ray from the plurality of rays, wherein the peak location adjustment rate for a peak from the plurality of peaks is based upon the catchment region of the peak, and wherein the peak distance of the containing peak is updated further based on a peak shift parameter, wherein the peak shift parameter is a product of the peak location adjustment rate of the containing peak and a magnitude of a difference between the peak distance of the containing peak and the data point distance of the data point lying within the catchment region of the containing peak.

14. The method of claim 1, further comprising marking one or more peaks from the plurality of peaks of the corresponding ray as skipped peaks for which the peak distance is less than the data point distance of the data point.

15. The method of claim 1, further comprising, if the data point lies within the catchment region of the containing peak, marking the containing peak as an improved data point.

16. The method of claim 1, further comprising, if the data point lies within the catchment region of the containing peak, and if a peak from the plurality of peaks of the corresponding ray is not marked as the skipped peak and the peak height of the peak is greater than a quality threshold, marking the peak as a virtual data point.

17. A system for determining a background in a three-dimensional (3D) space, the system comprising:
a sensor configured to generate a point cloud data set for the 3D space, wherein the point cloud data set comprises a plurality of data points; and
a processor communicably coupled to the sensor, the processor configured to:
receive the point cloud data set from the sensor;
divide the 3D space into a plurality of rays extending from the sensor, wherein each ray comprises an azimuth and an elevation with respect to the sensor, and wherein each data point is enclosed by a corresponding ray from the plurality of rays;
define a plurality of peaks for each ray from the plurality of rays, wherein each peak from the plurality of peaks is located at a peak distance from the sensor and comprises a peak height equal to a predetermined initial value; and
define a catchment region for each peak from the plurality of peaks for each ray from the plurality of rays, wherein the catchment region for each peak comprises a catchment distance from the corresponding peak towards the sensor and the catchment distance from the corresponding peak away from the sensor;
wherein, for each data point from the plurality of data points, the processor is further configured to:
determine the corresponding ray from the plurality of rays enclosing the data point;
determine a data point distance of the data point from the sensor;
determine a peak increment value;
determine a containing peak from the plurality of peaks of the corresponding ray for which the data point lies within the catchment region of the containing peak;
increment the peak height of the containing peak by the peak increment value;
define a new peak comprising a peak height equal to the peak increment value and a peak distance equal to the data point distance if the data point is outside the catchment region of each of the plurality of peaks of the corresponding ray; and
determine a backgroundness of the data point, and wherein the processor is configured to determine the backgroundness based on a magnitude of a difference between the data point distance and the peak distance of the containing peak.

18. The system of claim 17, wherein in order to determine the backgroundness of the data point, the processor is further configured to:
set the backgroundness equal to zero if the data point is outside the catchment region of each of the plurality of peaks of the corresponding ray; and
determine the backgroundness of the data point based at least on the peak height, the peak distance, and the catchment distance of the catchment region for the containing peak if the data point lies within the catchment region of the containing peak.

* * * * *